(12) United States Patent (10) Patent No.: US 7,318,015 B2
Carlson et al. (45) Date of Patent: Jan. 8, 2008

(54) METHOD, SYSTEM AND PROGRAM PRODUCT FOR GENERATING SCENARIOS UTILIZING GRAPHICAL OBJECTS REPRESENTING HIERARCHICALLY ARRANGED ELEMENTS OF A MODELED ENVIRONMENT

(75) Inventors: Gregory G. Carlson, Plano, TX (US); Heather Davis, Dallas, TX (US); John Edmondson Norvell, IV, Tulsa, OK (US); Kevin Lee Zierath, Plano, TX (US); Chandra S. Vemulapalli, Plano, TX (US); Vidhyaprakash Ramachandran, Dallas, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 882 days.

(21) Appl. No.: 10/170,615

(22) Filed: Jun. 12, 2002

(65) Prior Publication Data

US 2003/0006999 A1 Jan. 9, 2003

Related U.S. Application Data

(60) Provisional application No. 60/298,667, filed on Jun. 15, 2001, provisional application No. 60/297,448, filed on Jun. 13, 2001.

(51) Int. Cl.
*G06F 13/10* (2006.01)
(52) U.S. Cl. ............................ 703/21; 703/13; 703/23; 703/24; 709/238; 709/220
(58) Field of Classification Search .................... 703/2, 703/13, 21; 709/238; 715/853
See application file for complete search history.

(56) References Cited

U.S. PATENT DOCUMENTS

| | | | |
|---|---|---|---|
| 5,067,148 A | * | 11/1991 | Sardana ...................... 379/111 |
| 5,471,399 A | | 11/1995 | Tanaka et al. |
| 5,671,342 A | | 9/1997 | Millier et al. |
| 5,761,432 A | | 6/1998 | Bergholm et al. |
| 5,819,042 A | | 10/1998 | Hansen |
| 5,821,937 A | * | 10/1998 | Tonelli et al. .............. 715/853 |
| 5,831,610 A | | 11/1998 | Tonelli et al. |
| 5,889,954 A | | 3/1999 | Gessel et al. |

(Continued)

OTHER PUBLICATIONS

"Network Simulations with OPNET", X. Chang, Proceedings of 1999 Winter Simulation Conference, IEEE 1999.*

(Continued)

*Primary Examiner*—Fred Ferris

(57) ABSTRACT

A data model of a modeled environment is maintained within a database. The data model includes data defining a plurality of hierarchically arranged subsets of space within the modeled environment and data defining a plurality of items populating the modeled environment. In response to a first user input selecting a plurality of features of the modeled environment, where each of the selected features is one of the subsets of space or one of the items, a plurality of graphical elements are displayed within a whiteboard window to represent the plurality of user selected features. A control for at least one function is also presented to the user in association with the whiteboard window. In response to a second user input selecting the control for the function, a logical connection between at least two of the plurality of features having corresponding graphical elements within whiteboard window are automatically generated by reference to a rule set. In addition, a graphical element representing the logical connection is displayed within the whiteboard window.

33 Claims, 23 Drawing Sheets

U.S. PATENT DOCUMENTS

| | | | |
|---|---|---|---|
| 5,904,727 A | | 5/1999 | Prabhakaran |
| 5,910,803 A | | 6/1999 | Grau et al. |
| 5,930,779 A | * | 7/1999 | Knoblock et al. .......... 705/412 |
| 5,978,804 A | | 11/1999 | Dietzman |
| 5,991,759 A | * | 11/1999 | Knoblock et al. ............ 707/10 |
| 6,023,699 A | * | 2/2000 | Knoblock et al. ............ 707/10 |
| 6,075,530 A | | 6/2000 | Lucas et al. |
| 6,098,050 A | * | 8/2000 | Knoblock et al. ............ 705/28 |
| 6,169,987 B1 | | 1/2001 | Knoblock et al. |
| 6,427,132 B1 | * | 7/2002 | Bowman-Amuah .......... 703/22 |
| 6,487,604 B1 | * | 11/2002 | Rochford et al. ........... 709/238 |
| 6,580,194 B2 | | 6/2003 | Mizutani et al. |
| 6,654,354 B1 | * | 11/2003 | Watkins et al. ............. 370/258 |
| 6,724,382 B2 | | 4/2004 | Kenyon et al. |
| 6,772,204 B1 | | 8/2004 | Hansen |
| 6,909,700 B1 | * | 6/2005 | Benmohamed et al. ..... 370/255 |
| 6,983,227 B1 | * | 1/2006 | Thalhammer-Reyero ....... 703/2 |
| 2001/0026272 A1 | | 10/2001 | Feld et al. |
| 2003/0004925 A1 | | 1/2003 | Knoblock et al. |
| 2004/0015309 A1 | * | 1/2004 | Swisher et al. ............... 702/79 |

OTHER PUBLICATIONS

"OPNET Modeler", Product Description, OPNET Technologies Inc., Mar. 2001.*

"Business Continuity Planning", Nemzow, International Journal of Network Management, vol. 7, 127-136, 1997.*

* cited by examiner

Site Detail - 920

| Field | Value |
|---|---|
| Site Id | 920 |
| *Site Code | NRDNCA |
| *Site Type Code | DREI |
| *Mux Code | NRD |
| *Resp Dept Id | COE |
| *PCAT Id | CLASS 3 |
| Latitude | 39.3227777778 |
| Longitude | -120.3775 |
| *Active | ☐ |
| *Site Name | |
| *Address Line 1 | |
| *Address Line 2 | |
| *City | |
| *Zip / Postal | |
| *Lease | |
| *Service Type | |

| Sites | Site Type | Len of Cable to... | Regen Site(Y/N) | Amplifier Site(... |
|---|---|---|---|---|
| BLDWFL | Junction | 37.79 | N | N |
| SANDFL | Regen | 40.39 | Y | N |
| LAKEFL | Regen | 40.75 | N | N |
| FALMFL | Regen | 38.79 | Y | N |
| MADFFL | Regen | 37.76 | N | N |
| DRFTFL | Regen | 36.26 | Y | N |
| TLFRFL | DREI | 0 | N | N |

Tabs: View Saved | Site Select | Loss Values | Values Selected | Terminal

Buttons: Back | Cancel | Next

| Span Loss Budget | | | | | |
|---|---|---|---|---|---|
| View Saved | Site Select | Loss Values | Values Selected | Terminal | |
| Span | Distance | Theoretical | Measured | Entered | Select |
| BLDWFL-S... | 37.79 | 16.1 | 16.4 | N/A | Measured |
| SANDFL-LA... | 40.39 | 14.1 | 14.02 | N/A | Theoretical |
| LAKEFL-FA... | 40.75 | 14.3 | 14.3 | N/A | Measured |
| FALMFL-MA... | 38.79 | 14.9 | 14.9 | 14.92 | Entered |
| MADFFL-D... | 37.76 | 12 | 12 | N/A | Measured |
| DRFTFL-TL... | 36.26 | 12.5 | N/A | N/A | Theoretical |

Load Theoretical | Load Measured

Back | Cancel | Next

FIG. 10C

Span Loss Budget — 150

| Tab | | | | |
|---|---|---|---|---|
| View Saved (152a) | Site Select (152b) | Loss Values (152c) | Values Selected (152d) | Terminal (152e) |

Transmission Equipment: [▼]
Wavelength: [▼]

| Span | Vendor | Technology | Fiber Type |
|---|---|---|---|
| BLDWFL-SANDFL | Siemens | Siemens 16x16 | SM |
| SANDFL-FALMFL | Siemens | Siemens 16x16 | SM |
| FALMFL-DRFTFL | Siemens | Siemens 16x16 | SM |
| DRFTFL-TLFRFL | Siemens | Siemens 16x16 | SM |

[Back] [Cancel] [Next]

FIG. 10E

| Cable Connection Span - Route BAL-TAD | Cable Connects: Site BAL-Site 88E | | |
|---|---|---|---|
| Start Site | Start Site Type | End Site | End Site Type | Span Length |
| BLDWFL | Junction | SANDFL | Regen | 37.79 |
| SANDFL | Regen | LAKEFL | Regen | 40.39 |
| LAKELF | Regen | FALMFL | Regen | 40.75 |
| FALMFL | Regen | MADFFL | Regen | 38.79 |
| MADFFL | Regen | DRFTFL | Regen | 37.76 |
| DRFTFL | Regen | TLFRFL | DREI | 36.26 |

160

Start Site: WFL
End Site: IDFL
Span Length: 37.79
Total Span for Route: 231.74

| Span Loss and PMD entry - Span BLDWFL-TLFRFL - Fiber Ends: 3-3 | | |
|---|---|---|
| Start Fiber No | End Fiber No | Theoretical Span Los |
| 1 | 1 | 12.51 |
| 2 | 2 | 12.51 |
| 3 | 3 | 12.51 |
| 4 | 4 | 12.51 |
| 5 | 5 | 12.51 |
| 6 | 6 | 12.51 |
| 7 | 7 | 12.51 |
| 8 | 8 | 12.51 |
| 9 | 9 | 12.51 |
| 10 | 10 | 12.51 |
| 11 | 11 | 12.51 |
| 12 | 12 | 12.51 |
| 13 | 13 | 12.51 |

Fiber Dispersion: 
Measured Wavelength: 1550NM
Measured Loss: 16.4
Connector Loss Included: ☐
Theoretical Span Loss: 12.51
PMD Coefficient: 5.71
DGD: 34.8
+/- 10%: ☐
Updated by TSO: ☐

METHOD, SYSTEM AND PROGRAM PRODUCT FOR GENERATING SCENARIOS UTILIZING GRAPHICAL OBJECTS REPRESENTING HIERARCHICALLY ARRANGED ELEMENTS OF A MODELED ENVIRONMENT

CROSS-REFERENCE

The present application claims priority to U.S. Provisional Patent Application Ser. Nos. 60/297,448, filed Jun. 13, 2001 and 60/298,667 filed Jun. 15, 2001. The present application is related to U.S. Patent Application No. 10/170,616, filed Jun. 12, 2002, and entitled "Method, System, and Program Product for Viewing and Manipulating Graphical Objects Representing Hierarchically Arranged Elements of a Modeled Environment. The above-listed applications are assigned to the assignee of the present application and incorporated herein by reference in their entireties.

BACKGROUND OF THE INVENTION

1. Technical Field

The present invention relates in general to data processing and in particular to a data processing system, method and program product that utilize a hierarchical framework to model and manage an environment containing a collection of items.

2. Description of the Related Art

Affordable technology, and in particular the availability of powerful, commercially affordable computer systems and associated data storage, has revolutionized business practices and management over the preceding decades. This revolution has led to the development of software tools to manage and monitor data regarding all aspects of a business, including facility management, financial services (e.g., finance, accounting, and payroll), human resources, Enterprise Resource Planning (ERP), Customer Relationship Management (CRM), Supply Chain Management (SCM) and Product Distribution Management (PDM). It is typical for large corporations to license or internally develop one or more business software tools to perform these general business functions, as well as additional engineering, manufacturing, or other industry-specific software tools to provide functionality related to the specific lines of business of the corporation.

The variety of available software tools and the independent adoption of various software tools by various business units of a corporation can result in the corporation utilizing an amalgam of incompatible applications that utilize numerous diverse databases. As a consequence of the adoption of incompatible software tools and data formats, the flow of information between corporate departments is hampered. In addition, inefficiency and data errors may result from entering and/or modifying the same data in the multiple different databases utilized by the various software tools. From a financial perspective, the adoption of multiple diverse software tools results in a high cost of ownership due to the small number of users supported by each individual software tool.

In response to these issues, some commercial software vendors have developed software platforms that are intended as a complete solution to corporate software needs. Such platforms are designed to support a number of business functions (e.g., ERP, SCM, CRM, etc.) and to permit data sharing between business units. Although powerful, such platforms often require skilled users having significant training and do not address the need to have a graphical and intuitive interface that permits users having little training to efficiently utilize the software.

SUMMARY OF THE INVENTION

In recognition of the foregoing, the present invention provides a method, system and program product that provide an improved user interface for a software platform that enables the construction, storage and modification of a data model of a modeled environment.

In accordance with the present invention, a data model of a modeled environment is maintained within a database. The data model includes data defining a plurality of hierarchically arranged subsets of space within the modeled environment and data defining a plurality of items populating the modeled environment. In response to a first user input selecting a plurality of features of the modeled environment, where each of the selected features is one of the subsets of space or one of the items, a plurality of graphical elements are displayed within a whiteboard window to represent the plurality of user selected features. A control for at least one function is also presented to the user in association with the whiteboard window. In response to a second user input selecting the control for the function, a logical connection between at least two of the plurality of features having corresponding graphical elements within whiteboard window are automatically generated by reference to a rule set. In addition, a graphical element representing the logical connection is displayed within the whiteboard window.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 illustrates a Site Detail window presented by the graphical user interface of a software platform in accordance with one embodiment of the present invention;

FIGS. 10A-10E depict the display of a Span Loss Budget window in accordance with an embodiment of the present invention;

FIG. 12 depicts the display of a Span Loss and PMD window in accordance with an embodiment of the present invention.

In the figures, like reference numbers generally indicate identical, functionally similar, and/or structurally similar elements.

DETAILED DESCRIPTION OF A PREFERRED EMBODIMENT

Figure 1:
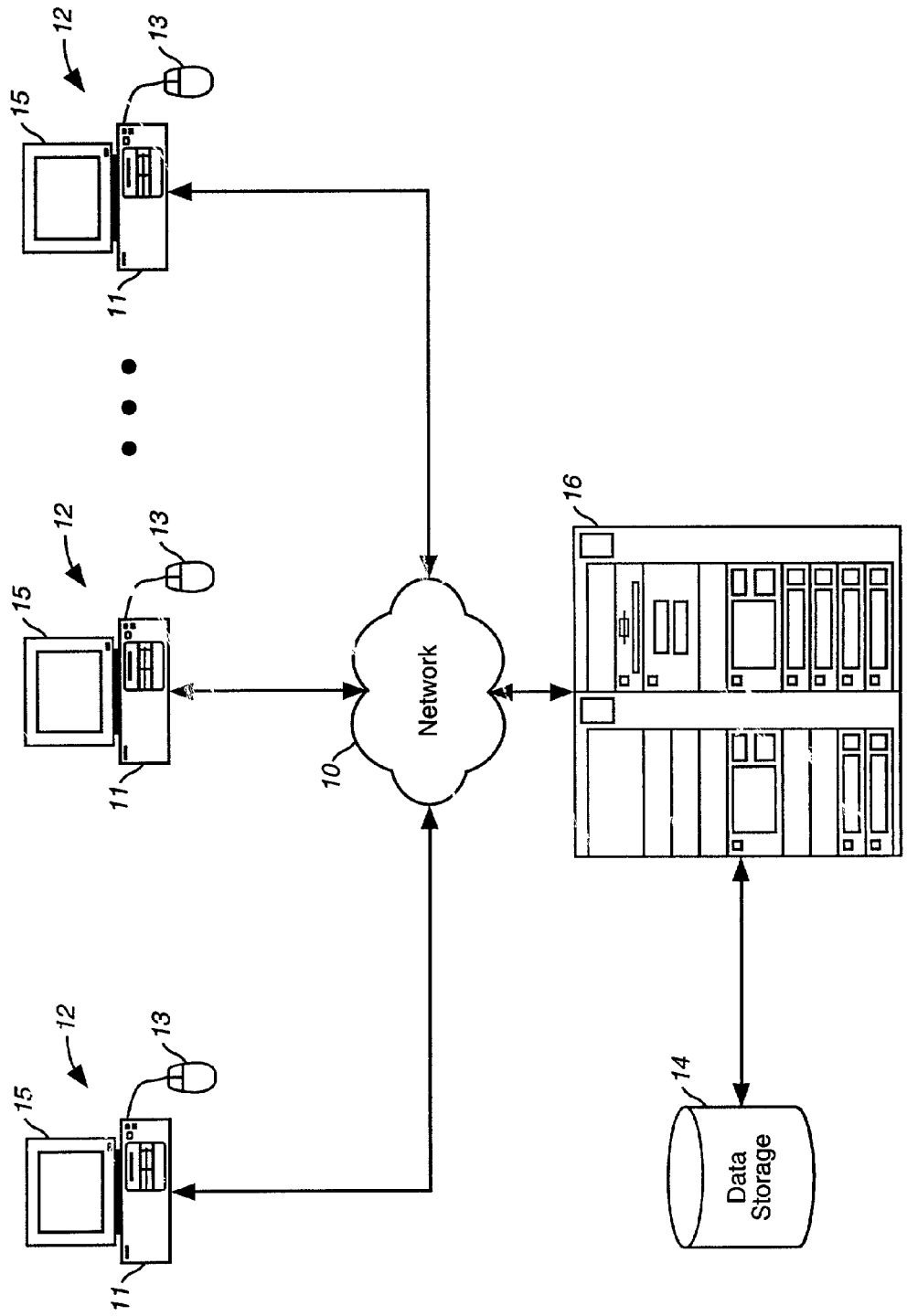
FIG. 1 is a high level block diagram of an exemplary computer network in which the present invention may be implemented.

With reference now to the figures and in particular with reference to FIG. 1, there is depicted a block diagram of an exemplary network in which the present invention may be practiced. As illustrated, a network 10, which represents any type of data and/or telecommunications network or combination thereof, couples a plurality of workstations 12 with data storage 14. In network 10 illustrated in FIG. 1, data storage 14 is coupled to and accessed by workstations 12 through a database server 16 coupled to network 10.

In some embodiments of the present invention, network 10 can be implemented as a company-wide intranet. In other embodiments, network 10 may comprise one or more local area networks (LANs) or wide area networks (WANs), for example, the Internet, linked by conventional bridges, routers or the like. In addition, network 10 can include wireless networks, switched networks, and other forms of common carrier transmission lines and equipment that can link remote computers, such as the remote workstations 12, to data storage 14.

Each workstation 12 may be implemented with a general-purpose computer system generally including a processing unit 11, graphical pointing device (e.g., mouse) 13 and a display device 15. In a host-based embodiment, each workstation 12 executes software (described in detail below) that causes the workstation 12 to perform the functions described herein. In other embodiments, certain workstations 12, database server 16, or other unillustrated computers may function as a server by executing some or all components of the software, while other workstations 12 may function as a client by executing other software components or complementary applications (e.g., a web browser) utilized to access the software functionality remotely.

Figure 2:
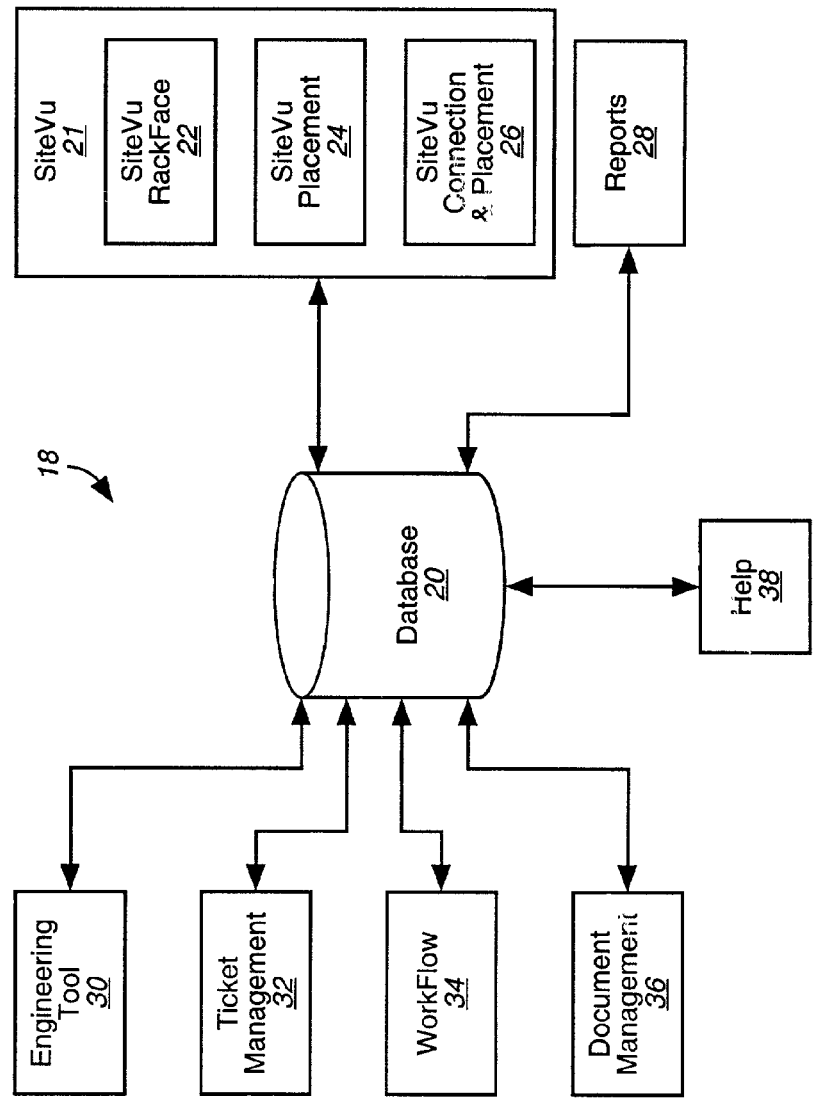
FIG. 2 is a block diagram of a logical architectural view of a software platform in accordance with the present invention.

Referring now to FIG. 2, there is illustrated a logical architecture of the software platform the present invention, which may be executed within the operational environment shown in FIG. 1. As shown, software platform 18 comprises a number of modules 22-38 coupled to a central database 20. Database 20 may be stored at least partially within data storage 14, and modules 22-38 may be executed by one or more of workstations 12 and database server 16.

Through execution of modules 22-38, software platform 18 allows a user to construct a data model within database 20 of any virtual or physical environment and then populate the modeled environment with a collection of items. Software platform 18 permits users to graphically and intuitively view, manipulate, manage and connect various subsets of the environment's space as well as items placed within the modeled environment, where all of the permitted interactions with the modeled environment are ultimately carried out by creating, modifying, storing, accessing and/or processing real time data belonging to the data model. Like the SiteVu application described in U.S. patent application Ser. No. 09/995,193, software platform 18 of the present invention finds numerous applications, including retail store management, manufacturing and construction project management, facilities management, staffing and provisioning, agricultural resource management, waste removal and remediation, event management, community and regional planning, design, construction and management of data and communication networks, and virtual reality modeling. Thus, although the present invention is described below with reference to its application to the design, construction, and management of a telecommunications network, such descriptions should be viewed as illustrative of rather than limiting the scope of the present invention.

The data model of the modeled environment has at least two aspects: (1) an environmental hierarchy describing the modeled environment utilizing data-defined spaces of varying scopes and (2) an item hierarchy describing the items or groups of items belonging to the collection of items within the modeled environment. For example, if the modeled environment is a building, the environmental hierarchy may include a plurality of hierarchy levels, such as floors, zones within one or more of the floors, planning units within one or more of the zones, rows within one or more planning units, and footprints within one or more planning units. In some embodiments, each environmental hierarchy level may be presented within a display device as a polygonal graphical shape that completely encloses the lower environmental hierarchy level(s), if any, contained therein. In other embodiments, there may be multiple subsets of spaces at the same level of the environmental hierarchy.

Each item within the modeled environment may similarly be described by an item hierarchy having one or more levels. For example, for rack mounted electronic equipment, the item hierarchy may comprise a number of hierarchy levels, including a rack, one or more shelves within the rack, one or more slots within each shelf, and possibly circuit cards installed in one or more slots. Other items may have more or fewer hierarchy levels. In a preferred embodiment, a data model of the modeled environment is constructed by entering data describing the environmental hierarchy and the item hierarchies of one or more items and then specifying associations between the lowest level of the environmental hierarchy and the highest level of item hierarchy of each item populating the modeled environment. In this manner, the location of items within the modeled environment is well defined, and the user can easily traverse between elements of the environmental hierarchy and the items populating the modeled environment.

In accordance with one embodiment, the data model of the present invention is time-dependent, meaning that at least some of the elements of the data model (i.e., environmental hierarchy features or items) have associated chronological information (e.g., date and optionally time information) within database 20. For example, in modeling environments that vary with time, it may be helpful to track within database 20 at least some of the following dates (and optionally times) for at least some elements of the data model: (1) planned and actual physical installation, (2) planned and actual commission (i.e., when element is operational or usable), (3) planned and actual decommission (i.e., when element is no longer operational or usable), and (4) planned and actual physical removal.

As depicted in FIG. 2, modules 22-38 include a number of modules of the SiteVu application suite 21, including at least SiteVu RackFace (SVRF) tool 22, SiteVu Placement (SVPL) tool 24 and SiteVu Connection and Placement (SVCP) 26. The SiteVu application suite is described in detail in U.S. patent application Ser. No. 09/995,193, filed on Nov. 27, 2001, and entitled "Method, System and Program Product that Utilize a Conceptual Framework to Model an Environment Containing a Collection of Items," which is a continuation-in-part of U.S. patent application Ser. No. 09/702,184, filed on Oct. 31, 2000, and entitled "System and Method to Automate Equipment Placement at Remote Sites," which is in turn a continuation of U.S. Pat. No. 6,169,987. The SiteVu application suite is also described in U.S. patent application Ser. No. 09/995,193, filed Nov. 27, 2001, and entitled "Method, System and Program Product that Utilize a Hierarchical Conceptual Framework to Model an Environment Containing a Collection of Items," as well as U.S. Pat. Nos. 5,930,779, 5,991,759, 6,098,050, and 6,023,699. All of these applications and patents are incorporated herein by reference in there entireties.

SVRF tool 22 reads data from and stores data into database 20 to define items and item components within a product catalog, which may then be utilized to populate the modeled environment. In addition, SVRF tool 22 may be utilized to define configured items or item components within a configuration library from items within the product catalog and to modify or replace items placed within the modeled environment.

SVPL tool 24 reads data from and stores data into database 20 to place items from the product catalog or configuration library at locations within the modeled environment, relocate items within the modeled environment, and/or remove items from the modeled environment. As described in U.S. patent application Ser. No. 09/995,193, graphical representations of the items within the modeled environment and the environmental hierarchy can be presented from the data model within database and graphically manipulated to modify the data model through use of a Computer Aided Design and Drafting (CADD) program, such as Microstation CADD by Bentley Systems.

Because CADD programs are complex and expensive and many users require only need to view (but not modify) the items and environmental hierarchy of the modeled environment, the software suite may also include SiteVu Connection and Placement (SVCP) tool 26, which is a lightweight viewer that generates and presents a graphical representation of the data model without the use of a CADD engine. SVCP tool 26 also preferably permits a user to perform certain types of connections (e.g., power connections, telephone and/or data network connections, cost or profit sharing relationships, chronological relationships, etc.) between items within the modeled environment and validates the connections by reference to a ruleset.

Reports module 28 provides a generalized mechanism for accessing selected data from database 20 and presenting the selected data in various graphical, tabular, list and file formats.

Engineering tool 30 provides a number of engineering, manufacturing and/or technical functions relevant to the items and environmental hierarchy within the modeled environment to which software platform 18 is applied. Engineering tool 30 may also provide a graphical presentation of a map of the modeled environment, which the user can navigate to locate particular areas of interest or valid sites at which items can be placed utilizing SVPL tool 24.

Ticket management 32 provides an automated system by which "tickets," that is, requests for service by a user of a relevant user community, can be entered, tracked, and annotated. For example, a ticket may contain a request to provide service, correct a problem with a good or service, provide customer service or billing assistance, etc.

Workflow module 34 provides an array of functionality related to scheduling, tracking, and completion of work related to the modeled environment. For example, workflow module 34 enables a user having sufficient authority to create projects comprising one or more hierarchical work units, such as "project," "phase," "activity" and "task." The user (or other users) may then assign the work units to individual users and user groups, view task status and milestone completion, receive notification (e.g., by email) upon occurrence of specified events triggered by modification of database 20, and other functionality useful for managing work related to the modeled environment.

Document management module 36 supports the ability to create, store, retrieve, and version electronic documents related to the modeled environment. A user is preferably able to associate the electronic documents (e.g., contracts, authorizations, permits, product documentation, etc.) with particular items or environmental hierarchy elements comprising the modeled environment in order to improve access to the electronic documents.

Finally, help module 38 provides assistance to users regarding the functionality of the other modules through conventional features such as bubble help, frequently asked questions (FAQs), a help index, etc.

Figure 3:
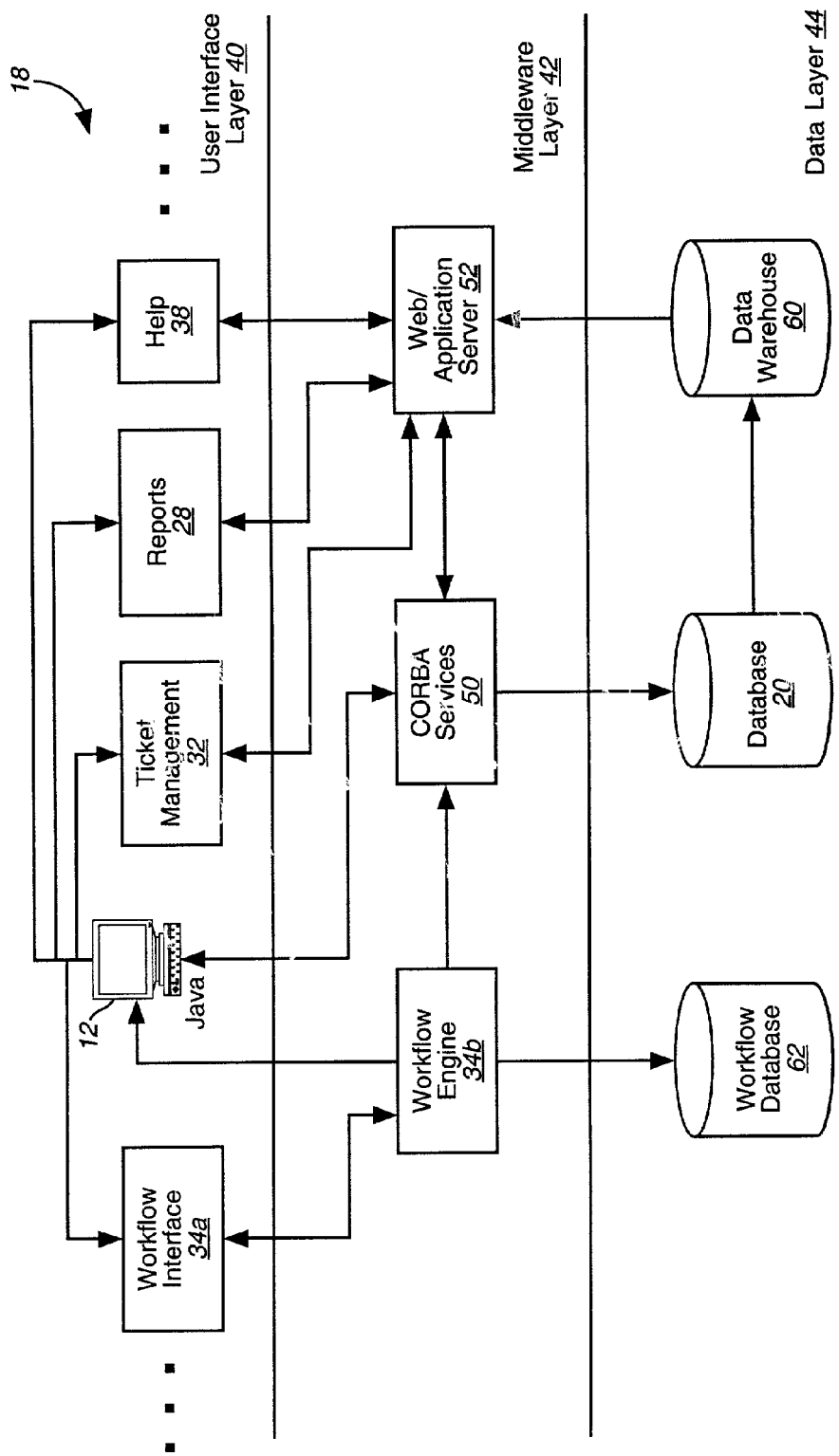
FIG. 3 illustrates the multi-level architecture of an exemplary implementation of the software platform architecture shown in FIG. 2.

With reference now to FIG. 3, there is depicted an exemplary implementation of the logical software architecture illustrated in FIG. 2. It should be understood, however, that the software platform 18 the present invention is subject to other object oriented programming (OOP) or procedural programming implementations that will be apparent to those skilled in the art and that all such implementations fall within the scope of the present invention.

As shown in FIG. 3, the logical software architecture illustrated in FIG. 2 may advantageously be implemented utilizing three layers: an upper user interface layer 40, a middleware layer 42 primarily comprising Common Object Request Broker Architecture (CORBA) services 50, and a lower data layer 44. This three-layer architecture supports scalability in that additional or replacement modules can easily be interfaced with the data model contained in database 20 through the standardized interfaces provided by CORBA services 50.

As indicated in FIG. 3, in one embodiment user interface layer 40 is implemented as a Java-based graphical user interface (GUI) application running on each workstation 12. Certain of modules 22-38, for example, ticket management module 32, SVRP help module 38, are implemented entirely as web applications that access content within database 20 through middleware including web/application server 52 and CORBA services 50. Others of modules 22-38, such as workflow module 34, employ the Java graphical user interface (GUI), but also include other interface software (e.g., workflow interface 34a) running locally on workstation 12.

As noted above, middleware layer 42 includes mainly CORBA services 50, which implement business rules based on the data model and user requirements. Middleware layer 42 also hosts the functional components of other modules, such as workflow engine 34b. Importantly, middleware layer 42 is the only communication path to the database 20 and for modules 22-38, as well as for other external systems. Middleware layer 42 also validates the logical "connections" between the various graphical entities presented by interface layer 40 based upon a set of business rules and the data model implemented in database 20.

Data layer 44 supports database 20 as well as a data warehouse 60 utilized exclusively for reporting purposes and as "data feed" for downstream systems. Database 20 may be implemented, for example, utilizing Oracle 81 and is preferably architected with an Oracle parallel server for enhanced reliability. As shown, data layer 44 may further include additional separate databases for certain modules, such as workflow database 62. It should also be noted that the data retrieved from database 20 and communicated by CORBA services 50 to other software components is real time data rather than static data and is therefore subject to continual updates by the user community.

Figure 4:
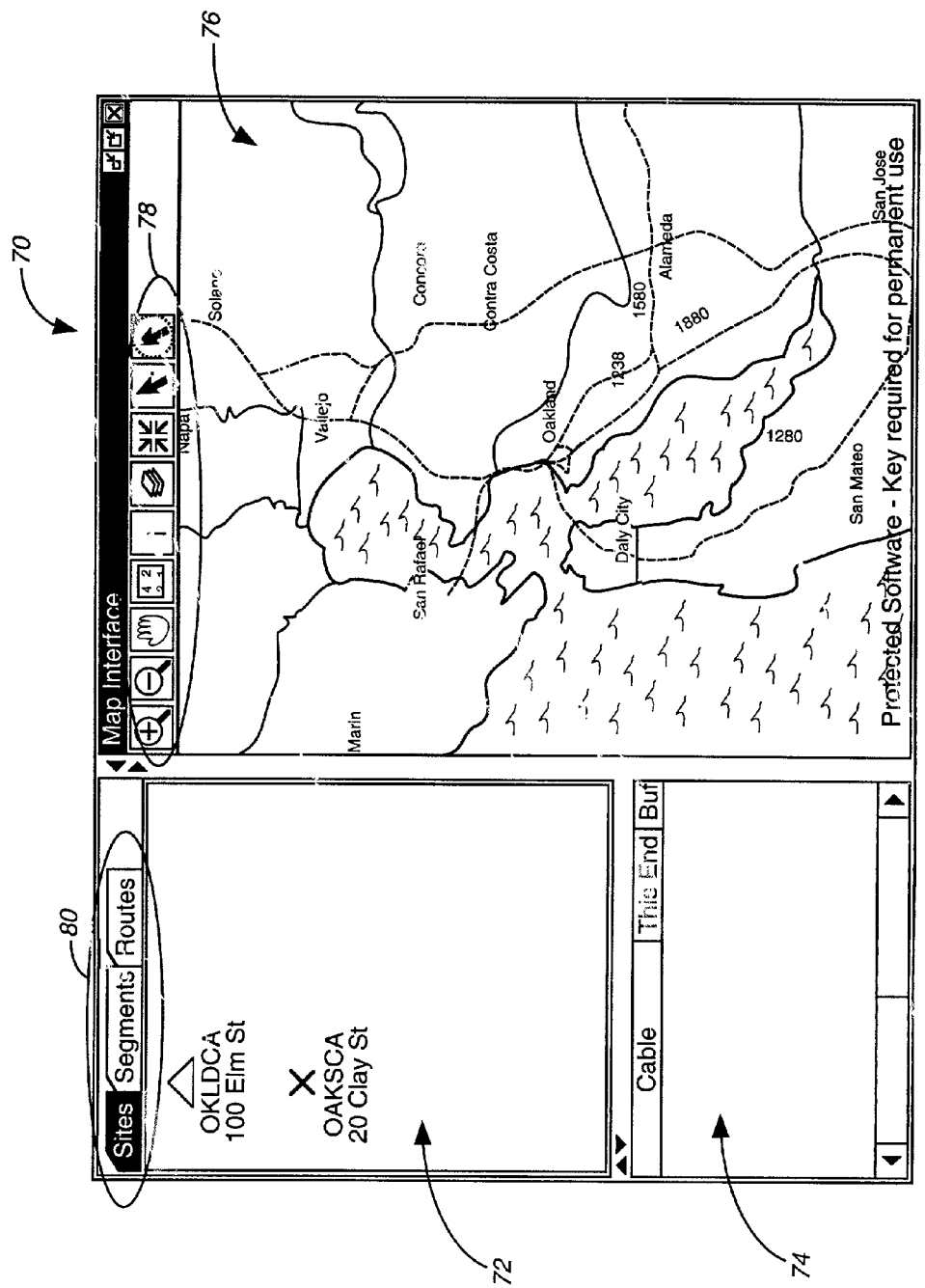
FIG. 4 depicts a Workspace window presented by the user interface layer of a software platform in accordance with one embodiment of the present invention.

Referring now to FIG. 4, there is illustrated an exemplary embodiment of a Workspace window 70 displayed within the display device of a workstation 12 by the Java-based user interface layer 40 depicted in FIG. 3. As shown, Workspace window 70 includes a subwindow 72 in which elements of the environmental hierarchy can be graphically displayed and managed and another subwindow 74 in which items placed within the modeled environment can be graphically displayed and managed utilizing a graphical pointing device. In the particular embodiment illustrated in FIG. 4, the modeled environment is a geographical region including a telecommunications network, the environmental hierarchy includes network sites, routes and segments (segments being individual portions of a route), and the items that can be placed within the modeled environment include network cables and network equipment.

Through Workspace window 70, a user can employ a list-based interface, a name or feature search window, or a map interface to locate particular environmental hierarchy features or items of interest. If the user selects the map interface, for example, by selecting a map icon on a toolbar or selecting the map interface from a pull down or pop-up window, a map subwindow 76 is displayed within workspace window 70. Within map subwindow 76, items, elements of the environmental hierarchy (e.g., sites), and projects are graphically displayed overlaying a geographical map (e.g., of the San Francisco Bay area). The information displayed within map subwindow 76, which is stored within and retrieved from database 20, can be filtered according to the specific requirements of the user. In order to locate a particular feature of interest, the user may navigate the map utilizing conventional controls 78, such as zoom in, zoom out, and pan.

When a feature of interest (i.e., item or environmental hierarchy element) is located within the map (or in a list or by searching), the user can drag an icon representative of the site from the map, list or search results into an appropriate one of subwindows 72 and 74, and the icon will be added (copied) to the subwindow. In some embodiments, icon(s) representing search results are automatically added to the appropriate one of subwindows 72 and 74. Similarly, if the user drags an icon representative of a feature into map subwindow 76, the map will automatically pan and/or zoom to a view that contains the feature.

If the user then desires to "drill down" into a feature of interest graphically displayed within any of subwindows 72, 74 and 76, the user can double-click on the graphical representation of the feature. Doing so will result in the display of the next lower level of the item or environmental hierarchy related to the selected feature. Further information can also be obtained regarding certain features by right-clicking on the graphical representation of the feature of interest and selecting "View Detail" from a pop-up menu displaying options related to the selected feature. This results in the display of an informational window 82, such as that illustrated in FIG. 5, which presents detailed information (e.g., longitude and latitude, mailing address, etc.) associated with a particular network site. In a preferred embodiment, the detailed information presented within informational window 82 is tailored to the particular user based upon user group, permissions, preferences, etc. Certain fields within informational window 82 also permit entry of data (including data updates) into database 20 by users having appropriate permissions.

As represented by tabs 80 within subwindow 72 of FIG. 4, the user can also navigate between levels in the environmental hierarchy (and in some embodiments, the item hierarchy) by selecting the tab corresponding to the desired level. In this manner, the user can alternatively view all network sites, routes and segments associated with subwindow 72. In addition to viewing features of interest, subwindows 72 and 74 also permit a user with appropriate permissions to right-click on the background of subwindows 72 and 74 to be presented with a pop-up menu that includes a menu item that permits the user to create a new item (e.g., cable or network equipment) or element of the environmental hierarchy (e.g., site, route or segment). Wizard functionality is preferably integrated with subwindows 72 and 74 to assist in the creation of these new features (e.g., a new route between any two given sites).

Although many times the user may desire to view or modify the relationship between items and the lowest level of the environmental hierarchy (e.g., place a new item, remove or relocate an existing item), it is often helpful for the user to view and manage groups of items that are all associated with a higher level of the environmental hierarchy. For example, in the telecommunications embodiment depicted in FIG. 4, it may be desirable for the user to view all network cables having connections to a particular network site, where a site is at the highest level of the environmental hierarchy. To view such information, the user drags-and-drops (or selects utilizing another selection technique) a graphical representation of the environmental hierarchy feature of interest from subwindow 72 or map subwindow 76 into subwindow 74. In response, all items at the highest item hierarchy level defined by database 20 as having logical connection with the selected environmental hierarchy feature are displayed within subwindow 74, as shown in greater detail in FIG. 6.

Figure 6:
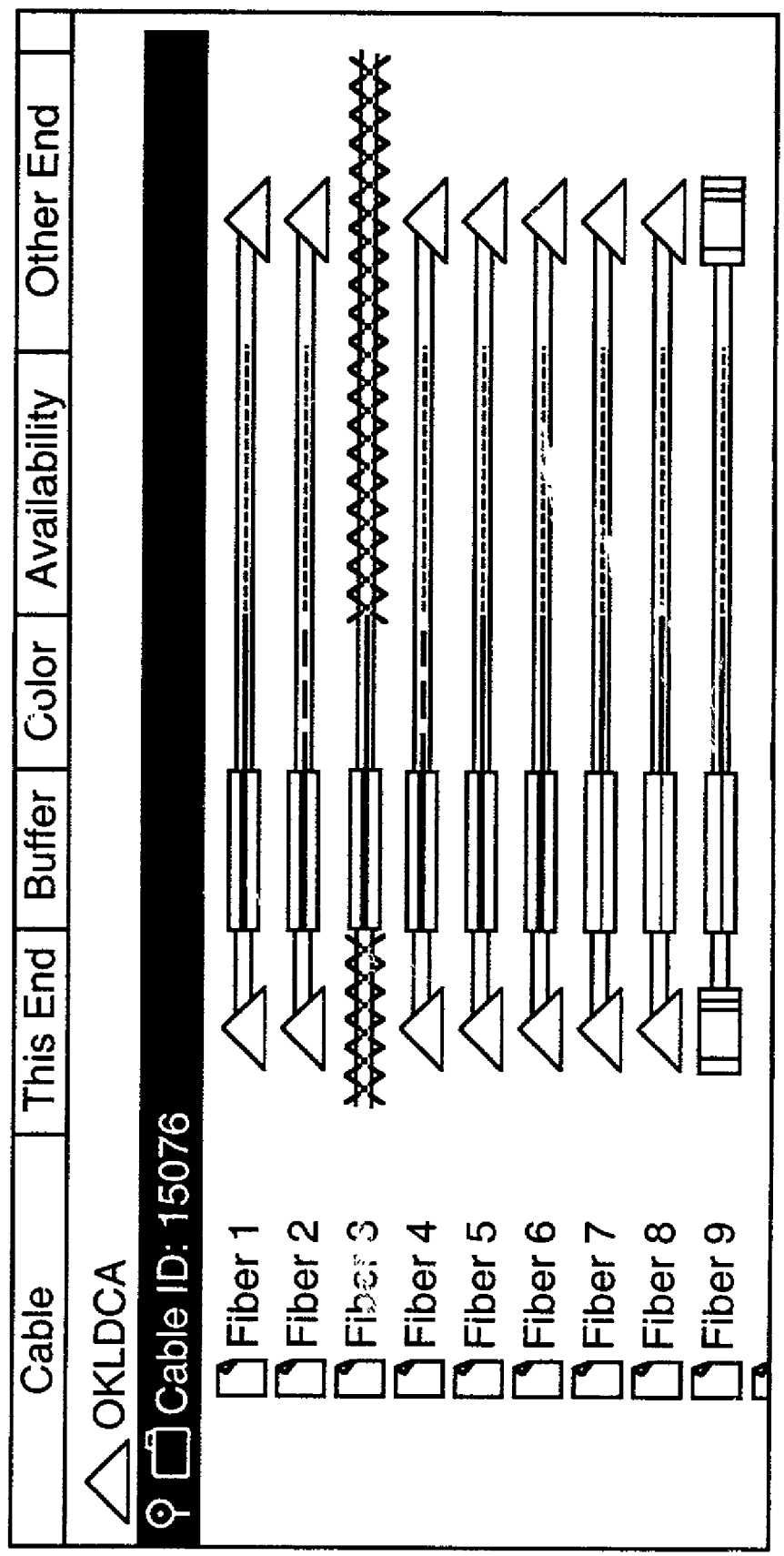
FIG. 6 depicts a Cable Fiber Tree displayed within a subwindow of the Workspace window in accordance with one embodiment of the present invention.

In the telecommunications embodiment shown in FIG. 6, dragging (or otherwise copying) an icon representing a network site from either of subwindows 72 or 76 into subwindow 74 results in the display of the associated Cable Fiber Tree, which shows all the cables that terminate at the selected site. The fibers can be identified (and summarized) graphically regarding their availability, their end-points, and other similar data that assist an engineer in selecting the fiber with the desired properties for a particular project. When the user right clicks on the site icon in the Cable Fiber Tree, the user is presented with a selection between viewing the cables outside the selected site, cables inside the selected site, or both. When the user right clicks on a cable displayed within the Cable Fiber Tree, the user is permitted to connect equipment to the cable, view a list of the cable fibers, splice a fiber and view a window displaying cable detail (similar to the Site detail window illustrated in FIG. 5). The user can also double-click on a cable to "drill down" to the next lower level of the item hierarchy for the cable and view all the fibers in the cable, as also shown in FIG. 6. In order to facilitate group operations (e.g., establish configuration settings), the user is also preferably permitted to select multiple items within subwindow 74, for example, by selecting with a graphical pointing device while depressing the "Shift" key.

In a preferred embodiment, each user can have multiple Workspace windows 70. By supporting multiple Workspace windows 70, the user can link each Workspace window 70 to a particular project developed utilizing workflow module 34, much like adding a website to the "Favorites" of a web browser. When users save the Workspace window 70, the saved workspace includes which subwindows are open, which features appear within subwindows 72 and 74, and other features of the interface. When a user reopens a saved Workspace window 70, the Workspace window 70 will open with the saved settings and will be populated with the real time data from database 20.

Figure 7A:
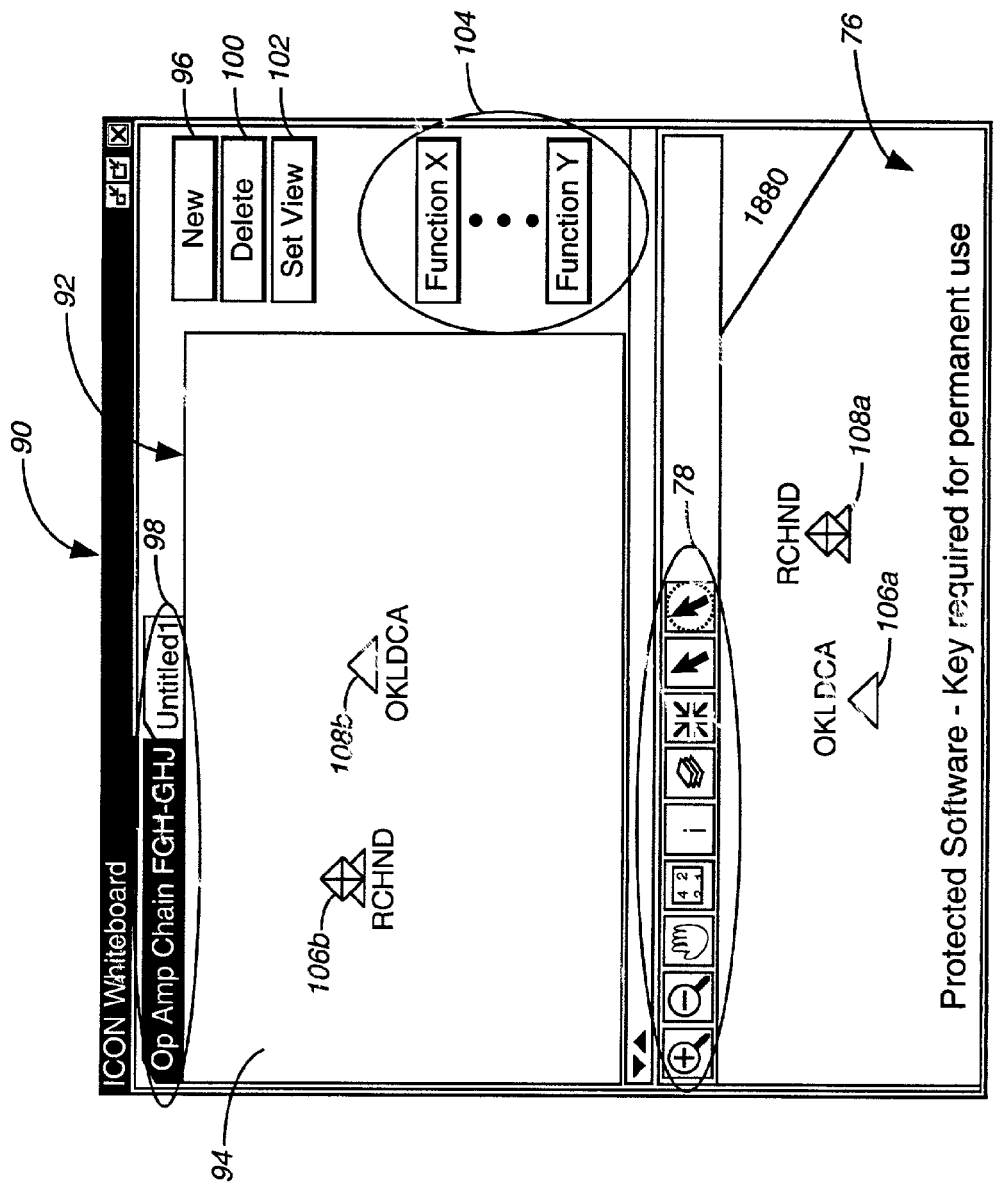
FIG. 7A illustrates a Whiteboard window presented by the user interface of a software platform in accordance with one embodiment of the present invention.

With reference now to FIG. 7A, user interface layer 40 of software platform 18 also preferably provides a Whiteboard window 90 that is displayed, for example, in response to user invocation through selection of an associated icon displayed within a launch bar or through selection of an associated menu item. As indicated in FIG. 7A by like reference numerals, a map subwindow 76 having navigation controls 78 be displayed within Whiteboard window 90, as discussed above with reference to Workspace window 70. In the illustrated embodiment, map subwindow 76 includes icons 106a and 108a, which represent sites within the environmental hierarchy of the modeled environment.

Whiteboard window 90 further contains a whiteboard region 92 that, much like a physical dry erase whiteboard, can be utilized by the user to construct various alternative scenarios related to projects, items within the modeled environment, features of the environmental hierarchy, and related connections and scheduling. The user establishes a new whiteboard page 94 within whiteboard region 92 by selecting New button 96, for example, utilizing a graphical pointing device or keyboard entry. In response, software platform presents a new whiteboard page 94 overlaying earlier created whiteboard pages 94, if any. The user can navigate between whiteboard pages selecting the desired one of tabs 98, and can delete the top whiteboard page 94 by selecting delete button 100. If desired, the user can title a whiteboard page 94 by right clicking on the whiteboard page 94 and selecting the "Title" option from a pop-up window.

To construct a scenario utilizing Whiteboard window 90, the user places a graphical object representing a selected item or element of the environmental hierarchy within a whiteboard page 94, for example, by dragging-and-dropping the item or environmental hierarchy element from map subwindow 76 of Whiteboard window 90 or any of the subwindows of Workspace window 70. The user may alternatively or additionally place a graphical object within whiteboard page 94 utilizing conventional cut-and-paste, search, or list selection techniques. In the depicted example, the user has placed icons 106b and 108b within whiteboard page 94, for example, by dragging icons 106a and 108a from map subwindow 76.

Once the user has moved a graphical object representing an item or environmental hierarchy element onto whiteboard page 94, the user selects "Set View" button 102 to access a list of functions that can be performed in connection with the feature of the modeled environment represented by the graphical object. In response to selection of "Set View" button 102, user interface layer 40 of software platform 18 displays controls (e.g., for example, function buttons 104) for the relevant functions. The function controls may alternatively or additionally be accessed through a toolbar or menu. In a preferred embodiment, the function controls presented to the user for selection depend upon which features of the modeled environment are represented within Whiteboard window, and function controls for functions not relevant to the user-selected features are not displayed.

Figure 7B:
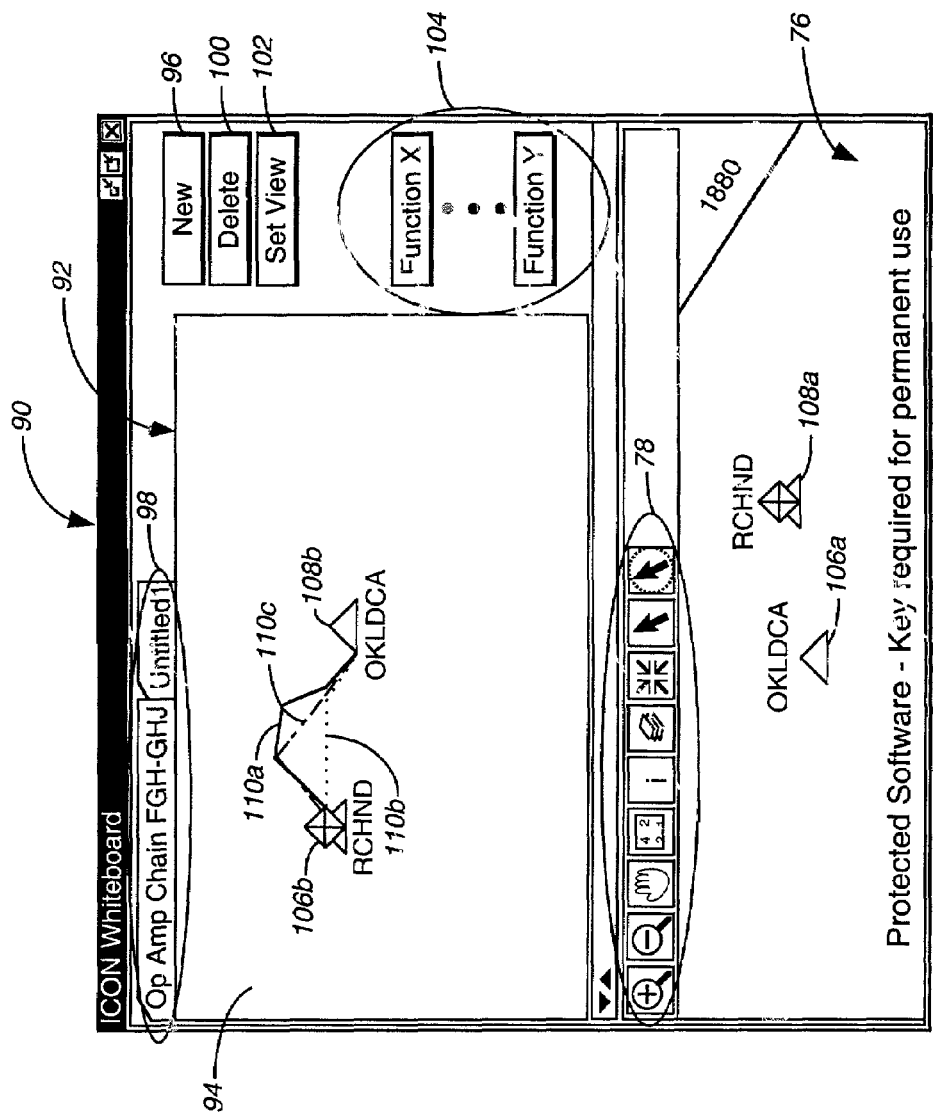
FIG. 7B illustrates the automated generation of one or more Route-Path scenarios within the Whiteboard window in accordance with an embodiment of the present invention.

In an embodiment in which software platform 18 provides functionality for the design, construction and management of a telecommunications network, one function that is provided by Whiteboard window 90 is a Route-Path function that, when invoked, creates one or more alternative telecommunications transmission systems between any two end-points. For example, as illustrated in FIG. 7B, selection of the function button 104 corresponding to the Route-Path function causes the software to automatically generate and graphically present multiple possible transmission systems 110a-110c based upon cost, available drop sites, vendors, equipment, and other factors, which are either entered by the user or accessed from database 20. Possible transmission systems 110 are generated utilizing business rules that reside in middleware layer 42 and/or are entered by the user. As described above with reference to Workspace window 70, the user can "drill down" into a selected possible transmission system 110 by double-clicking, and can request presentation of additional details by right clicking on a possible transmission system 110 and selecting the option "View Details" from a pop-up menu.

After the possible transmission systems 110 are generated, software platform 18 preferably permits display of the relevant factors in an evaluation matrix to assist the user (e.g., a network engineer) to select from among the multiple possible transmission systems 110. Importantly, the "what if" scenarios presented within Whiteboard window 90 are stored within database 20 separately from the data model of the modeled environment and can be retrieved at any time during or after the project is completed. The scenarios are preferably saved against multiple parameters such as the project, user, technology, vendor, etc. to permit easy search access.

Although a Route-Path function suitable for application to a telecommunications environment has been described, those skilled in the art will appreciate that similar functions are applicable to other modeled environments in which it is desirable to create logical connections between elements of the environmental hierarchy. In some but not necessarily all embodiments, such logical connections can be made utilizing items from the product catalog within database 20. In other embodiments, the logical connections may be financial (e.g., grouping business units for cost, profit, or tax analysis) or time based (e.g., linking the time at which certain events, installations or project milestones occur).

In an embodiment in which software platform 18 provides functionality for the design, construction and management of a telecommunications network, software platform 18 also provide an Equipment Connection function having an associated function button 104. The Equipment Connection function is similar to the Route-Path function in that both model logical connections between elements within the modeled environment, but differs in that the Equipment Connection function operates at a lower hierarchal level in that it provides a graphical representation and data model of logical cable connections between telecommunications equipment populating the modeled environment. As above, although the Equipment Connection function has been described with application to the modeling of a telecommunication system, it should be understood that the other similar functions for constructing logical connections between items within the modeled environment are contemplated by and fall within the scope of the present invention.

Figure 7C:
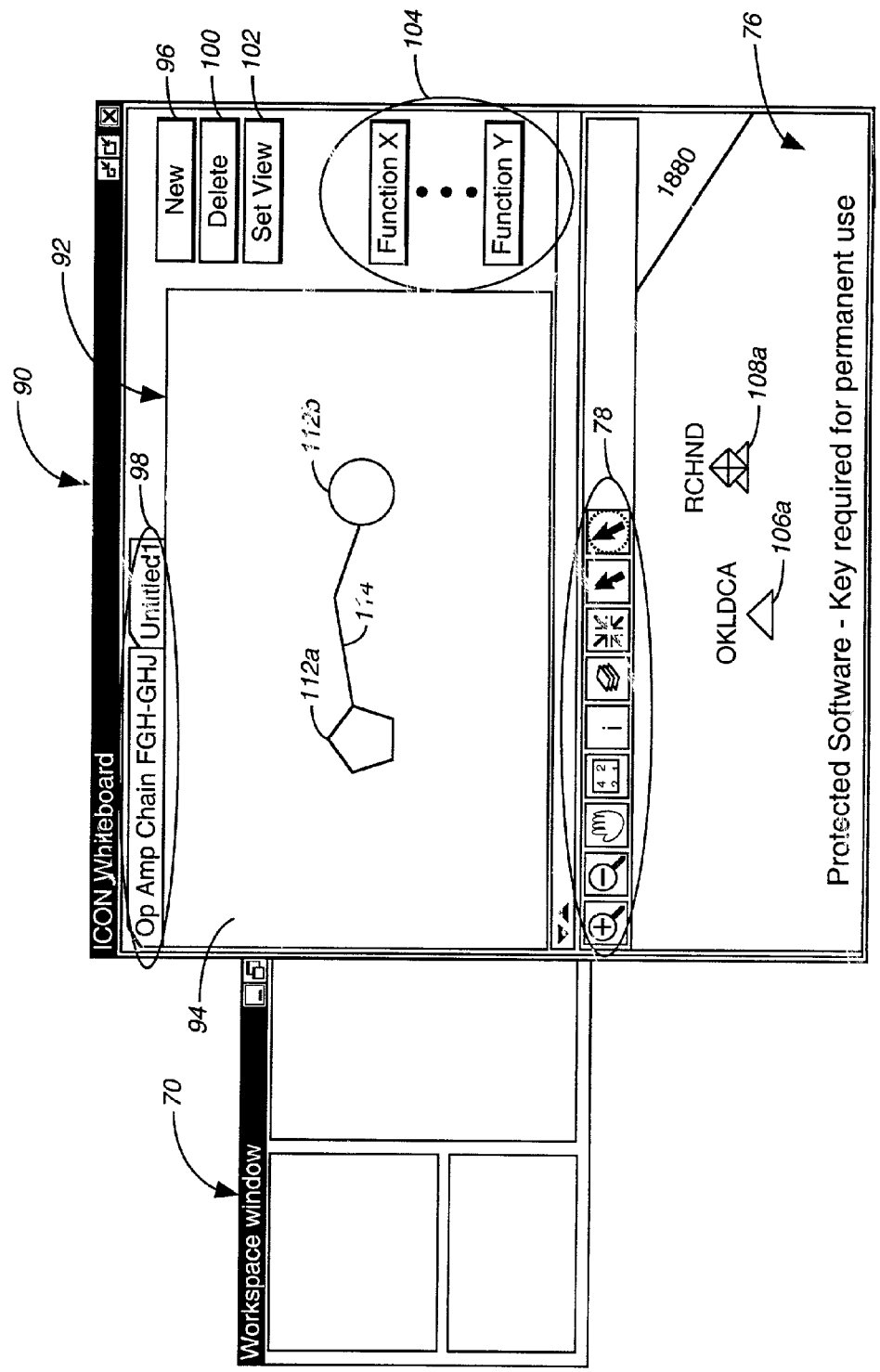
FIG. 7C illustrates the automated generation of one or more Equipment Connection scenarios within the Whiteboard window in accordance with an embodiment of the present invention.

As depicted in FIG. 7C, to utilize the Equipment Connection function (or other similar item connection function), the user first places icons 112a and 112b, which represent telecommunications equipment, within a whiteboard page 94. Icons 112a and 112b maybe dragged from workspace window 70 or placed within whiteboard page 94 utilizing cut-and-paste, through performing a search, or by making selections from an equipment list. In response to selection of Set View button 102, user interface layer 40 displays a function button 104 for the Equipment Connection function. In response to selection of the function button 104 for the Equipment Connection function, software platform 18 automatically creates and graphically presents one or more possible logical connections 114 between the equipment represented by icons 112a and 112b and validates the connection(s) 114 based on pre-defined or user-entered business rules. As above, the Equipment Connection scenario(s) generated within whiteboard window 90 are saved within database 20 against multiple parameters such as, the project, user, technology, etc., for subsequent access.

After a user has created one or more logical connection scenarios within Whiteboard window 90, a user having appropriate permissions or authorization can advantageously apply a selected scenario to the data model of the modeled environment within database 20 through Whiteboard window 90. In order to apply a selected logical connection scenario, the user may select the desired logical scenario to apply to the data model of the modeled environment utilizing a graphical pointing device, for example, by dragging-and-dropping the graphical representation of the logical connection from workspace region 94 into map subwindow 76. Alternatively, the desired logical connection scenario may be selected for application to the data model from a list window, by clicking one the graphical representation of the logical selection and selecting "Apply" from a menu, or other selection technique.

In response to selection of a logical connection scenario for application to the data model, software platform 18 preferably generates and presents to the user a list of requirements necessary to apply the scenario to the modeled environment utilizing business rules implemented within middleware layer 42. The list of requirements may include, for example, equipment to be decommissioned, removed or added, power supply system modifications, equipment reconfigurations, cabling changes, personnel needs, or any other known requirement of the scenario. Following or in conjunction with the presentation of the scenario requirements, software platform 18 preferably prompts the user to verify application of the selected scenario in view of the requirements. If the user verifies application of the scenario, software platform 18 automatically updates the data model within database 20 with the selected logical connection scenario. Typically, the updates to the data model within database 20 entails incorporation of the elements of the scenario within the data model (if not already present) and association of at least a future planned installation or planned commission date with the newly entered element(s).

User interface layer 40 of software platform 18 preferably further includes a time control that permits the user to view the modeled environment depicted in Workspace window 70 and/or Whiteboard window 90 as a function of time. The time control can preferably be invoked by the user utilizing a conventional graphical interface technique, such as selection of an item from a pop-up window displayed in response to a right click, selection of an item from a pull-down menu, or selection of a taskbar icon representing the time control.

Figure 8A:
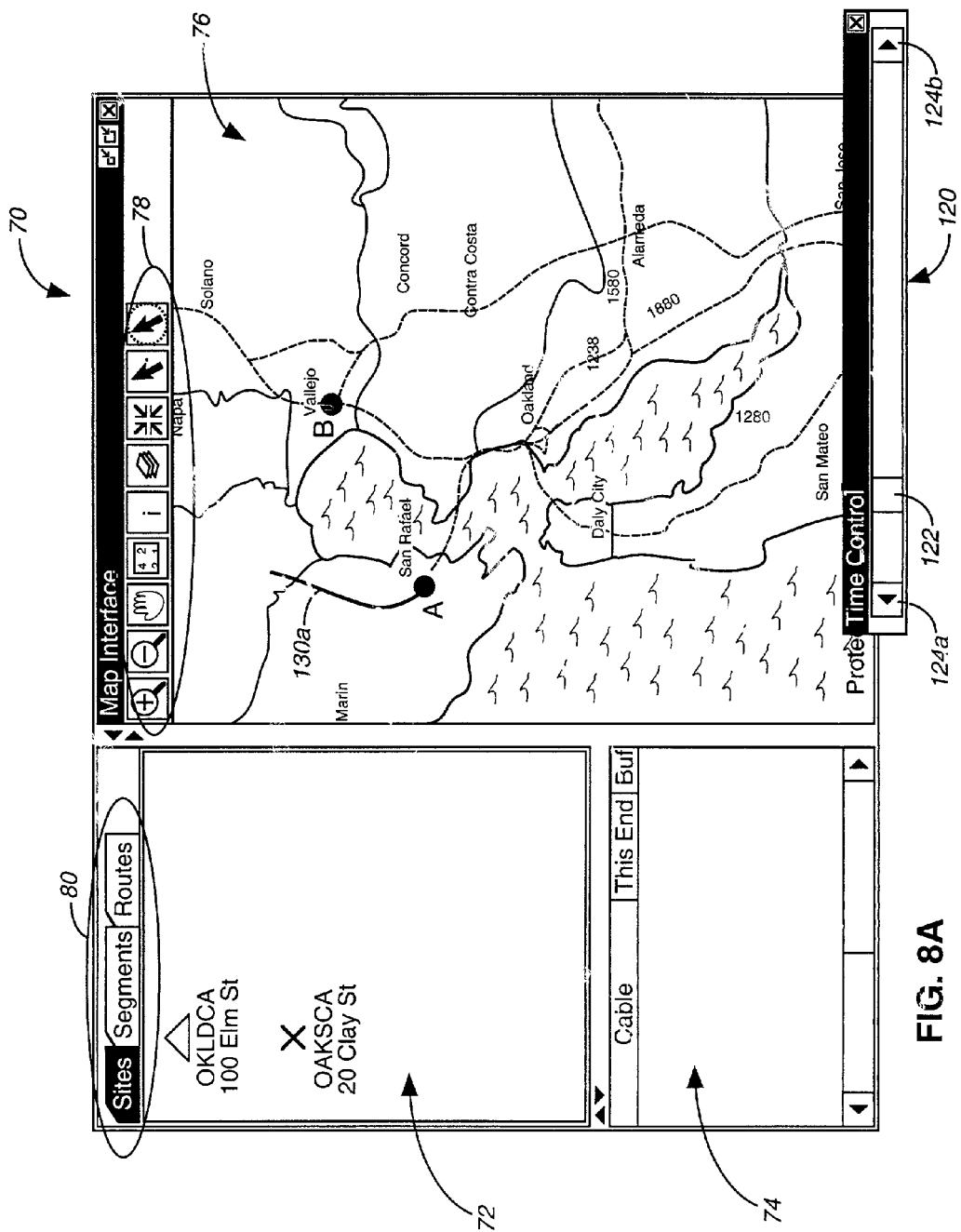
FIGS. 8A-8C depict the display of a project at various chronological times in response to various settings of a time control in accordance with the present invention.
Figure 8B:
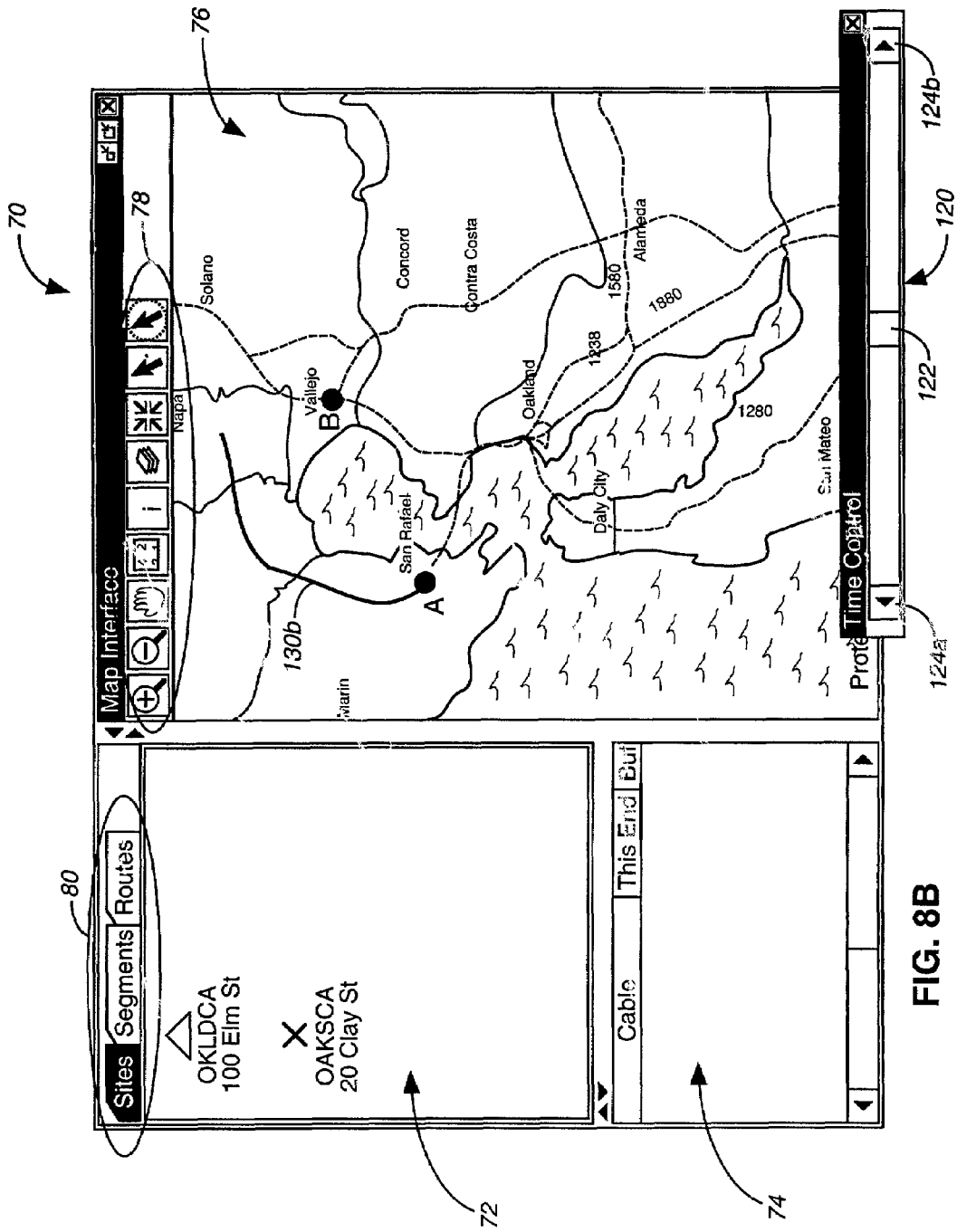
Figure 8C:
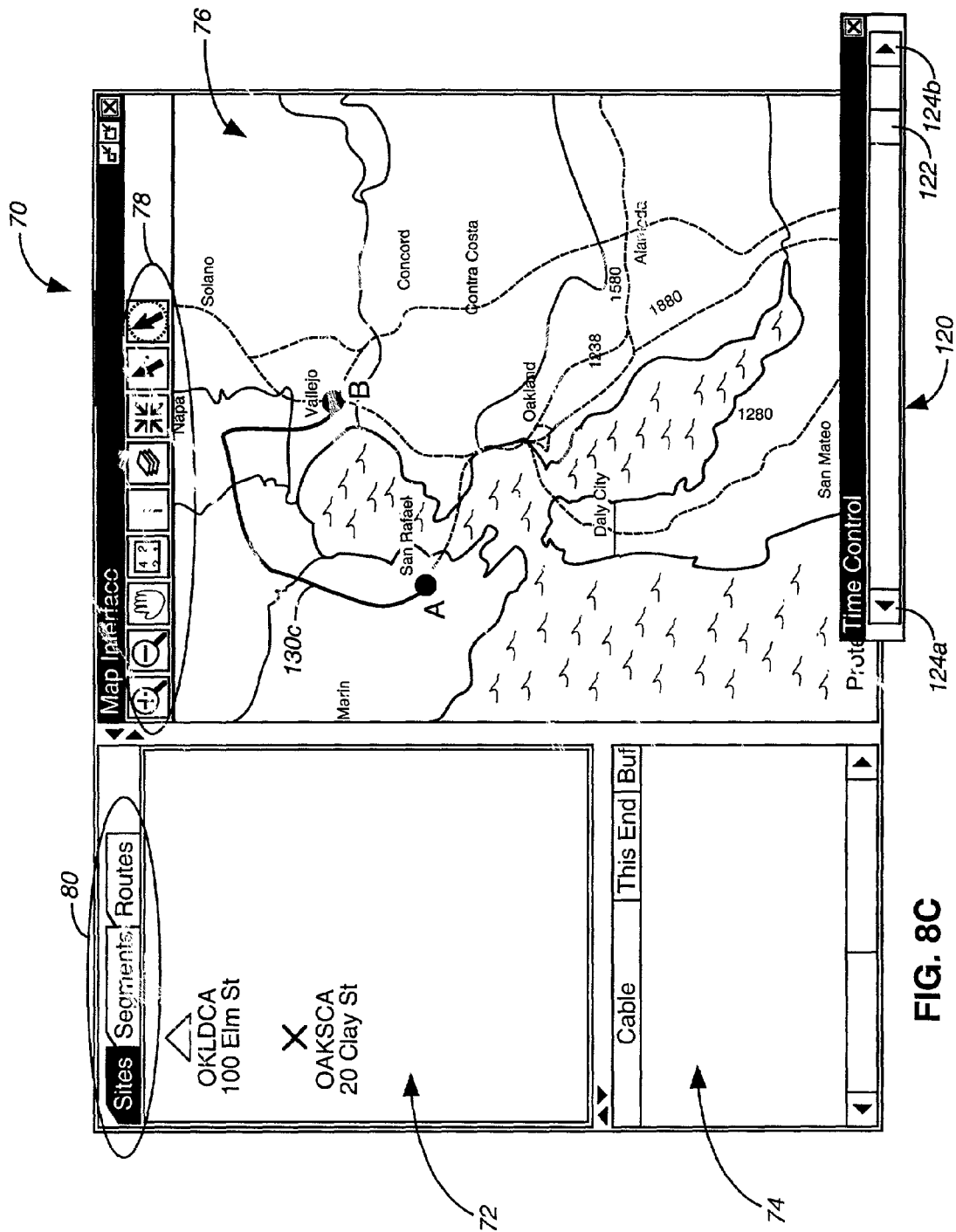

As shown in FIGS. 8A-8C, an exemplary time control 120 in accordance with the present invention may be implemented as a slider bar that selects an earlier chronological time when slider box 122 is positioned leftward relative to the slider bar and selects later chronological time when slider box 122 is position rightward relative to the slider bar. The chronological times represented by various positions of slider box 122 can be entirely in the past from a selected time (e.g., the current date and time), entirely in the future from the selected time, or partially in the past and partially in the future. The user can position slider box 122 either by dragging slider box 122 utilizing a graphical pointing device or by selecting arrows 124a-124b. User selection of a particular chronological time utilizing time control 120 inputs into software platform 18 a request to display within the affiliated window (e.g., a Workspace window 70 or Whiteboard window 90) only those graphical objects whose underlying data elements have associated chronological times no later than the time specified by time control 120.

For example, FIGS. 8A-8C illustrate the presentation within map subwindow 76 of workspace window 70 of a project involving the installation of telecommunications cable 130 between sites A and B. As the user moves slider box 122 from left to right, the user can view the progress of the cable installation (or cable design) connecting sites A and B. In this manner, the user can foresee or roll-back a design to desired milestones in case of any rework. For example, users can roll-back the project/design to the state prior to selecting an equipment or services vendor in the event that the selected vendor is no longer valid and must be replaced with a different vendor.

As noted above, engineering tool 30 of software platform 18 provides additional tools related to one or more specific applications of software platform 18. For example, in an embodiment of software platform 18 having particular application to designing, modeling and managing a telecommunications network, engineering tool 30 preferably provides tools utilized to visualize telecommunications cabling and perform calculations such as—span loss and PMD values. These tools can be utilized in conjunction with workspace window 70, whiteboard window 90 or other GUI facility and may be invoked through user interface layer 40, for example, by selection of a toolbar icon or a pull-down or pop-up menu item.

Time-based visualization of the data model is further enhanced by tracking within database 20 multiple dates (e.g., planned and actual physical installation, planned and actual commission, planned and actual decommission, and planned and actual physical removal) for at least some elements of the data model. Doing so enables multiple different views of the data model to be generated and displayed by the user through manipulation of time control 120. For example, as illustrated in FIGS. 8A-8C, the user may desire to view an "as built" view of the data model that presents the modeled environment as it appears as of the date (and optionally time) corresponding to the position of slider box 122. Additionally, by appropriate selection of preferences, the user can invoke the generation and display of a "plan view" that presents the "as built" view of the modeled environment as of a selected date corresponding to the position of slider box 122 plus the any elements having a planned installation date (and alternatively or additionally a commission date) within a user-selected or fixed time period of the selected date. Similar views of the modeled environment can be generated and displayed that depict elements having planned decommission and/or planned removal dates within a user-selected or fixed interval of the selected date. In each case, software platform 18 preferably depicts elements having different statuses relative to the selected date utilizing different colors and/or line styles so that the user can differentiate between the modeled environment "as built" and elements subject to planned installation, commissioning, decommissioning and/or removal.

Figure 8D:
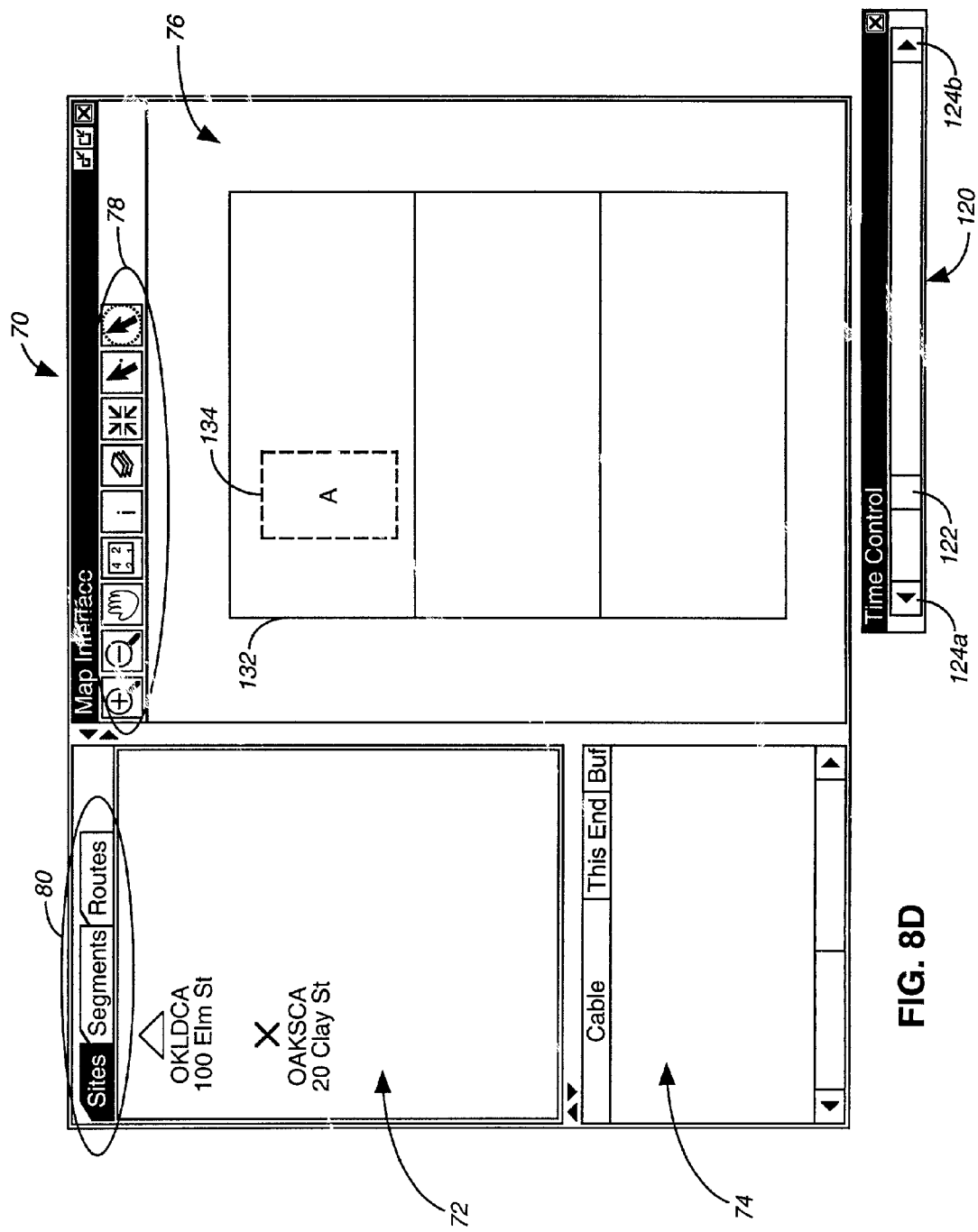
FIGS. 8D-8F depict the display a subset of space at various chronological times in response to various settings of a time control in accordance with the present invention.
Figure 8E:
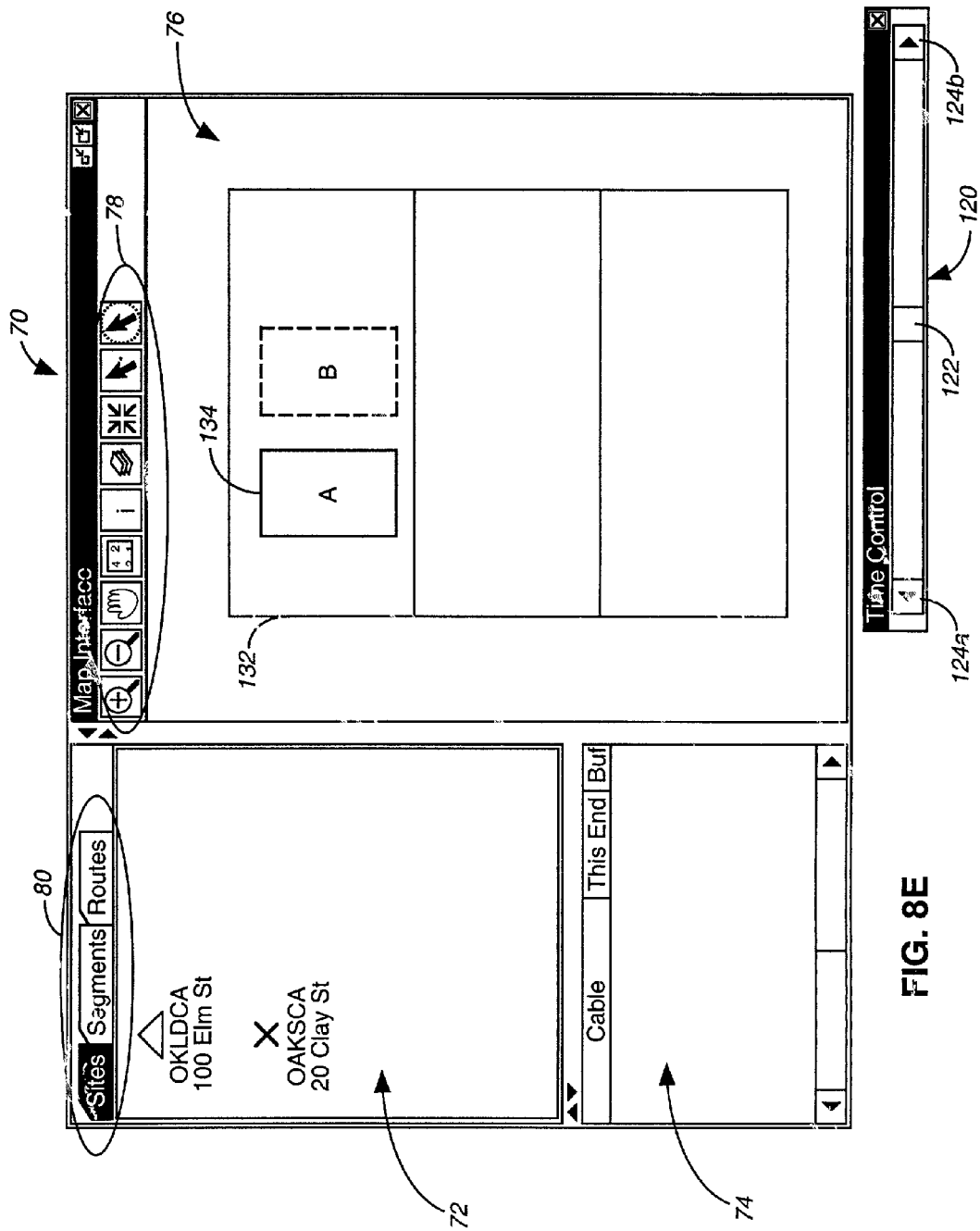
Figure 8F:
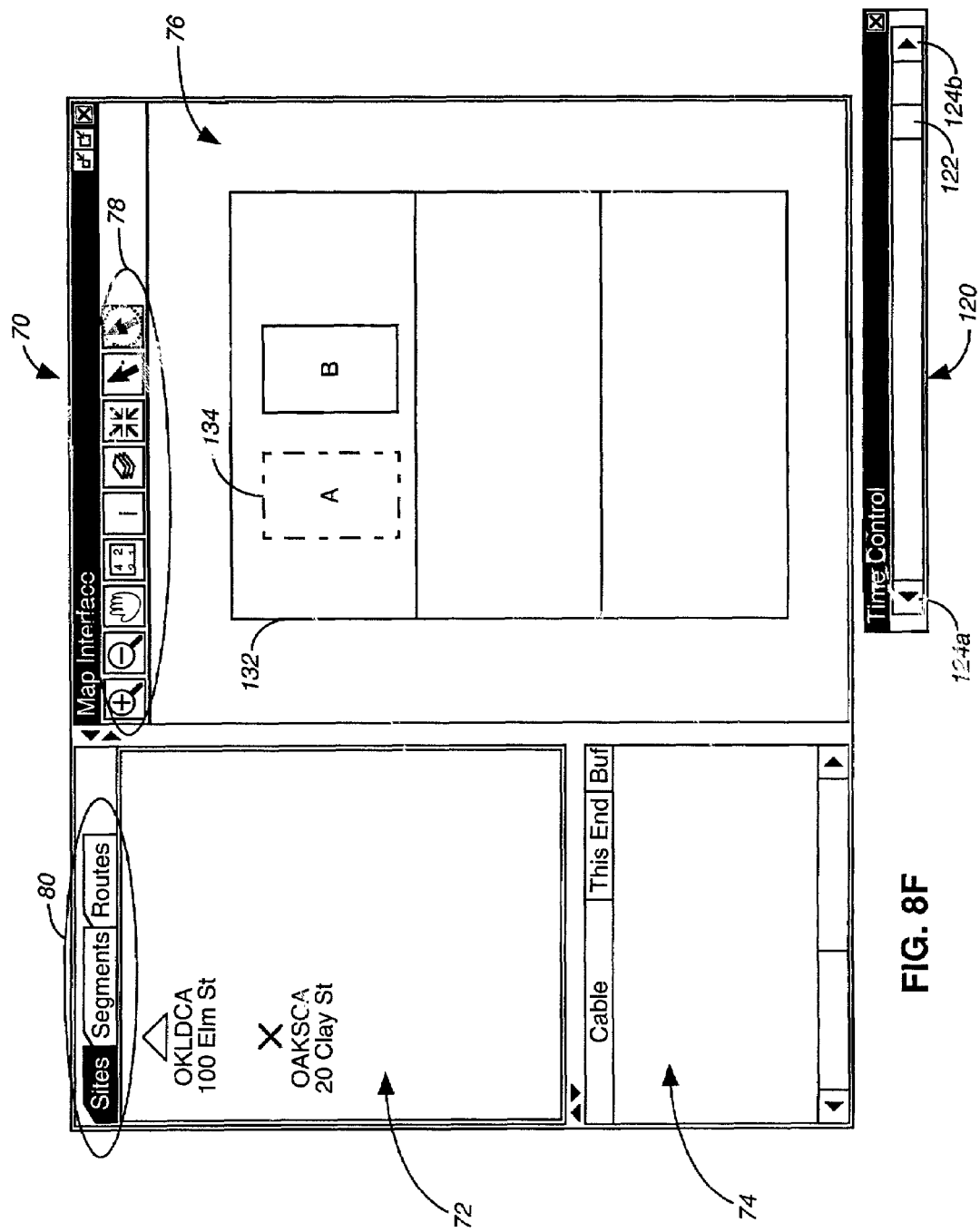

It should be understood that the time-based visualization supported by the present invention is not only useful for visualizing the growth of the modeled environment by the addition of elements through time, but is also useful to visualize the evolution of a particular subset of space through time. For example, FIGS. 8D-8F depict the evolution of a space subset 132 within a modeled environment through time. As shown in FIG. 8D, in response to user input, software platform 18 displays space subset 132 and displays an item 134 within space subset 132. By its line style and/or line color and/or its fill style and/or fill color, software platform 18 indicates to the user that, as of the date (and optionally time) corresponding to the position of slider box 122, item 134 has a future planned installation date. As illustrated in FIGS. 8E and 8F, respectively, as the user moves slider box 122, the installation of item 134 within space subset 132 and the planned removal of item 134 from space subset 134 are similarly graphically presented to the user by changes in the line style/color and/or fill style/color of item 134.

Figure 9:
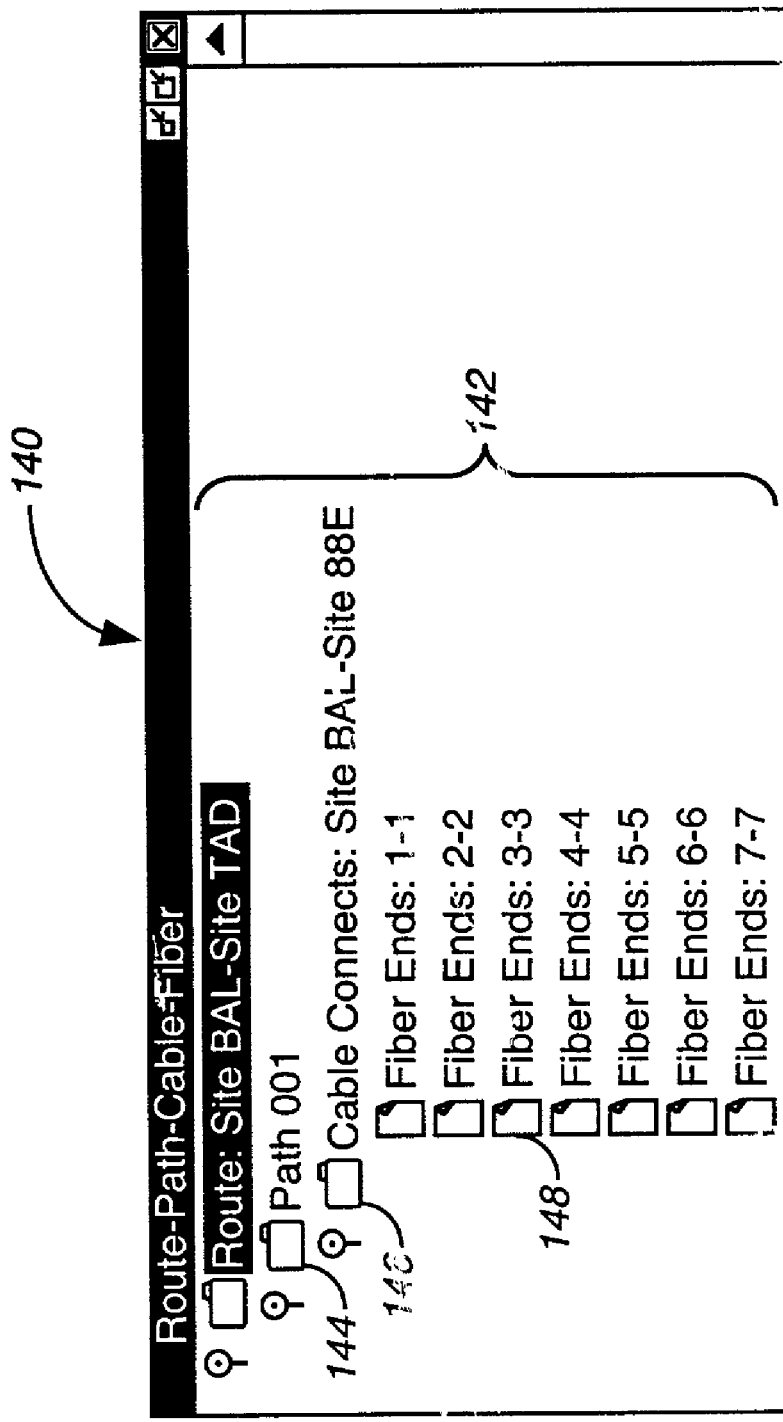
FIG. 9 illustrates the display of a window containing a Route-Path-Cable-Fiber tree in accordance with an embodiment of the present invention.
Figure 10A:
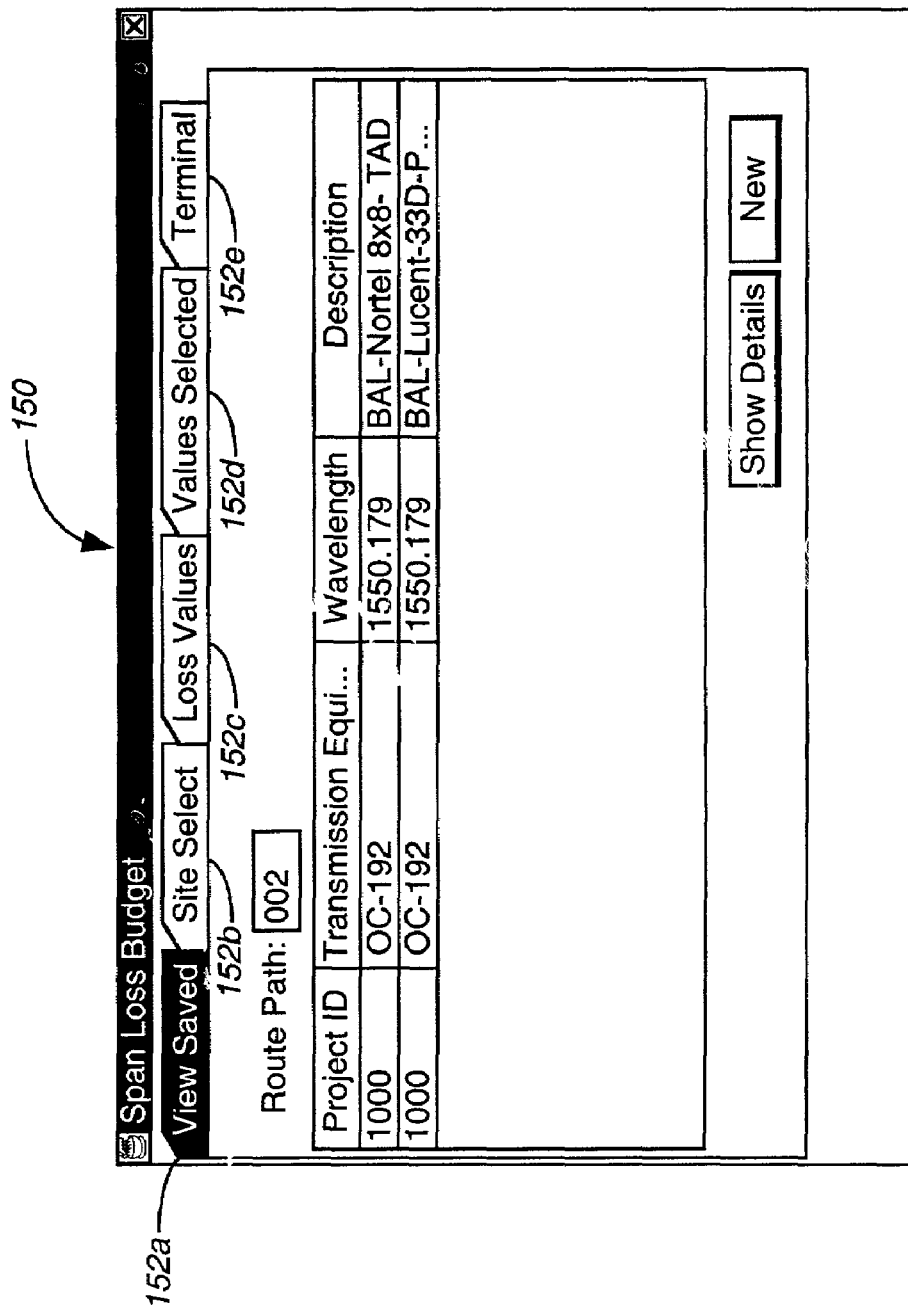
Figure 10D:
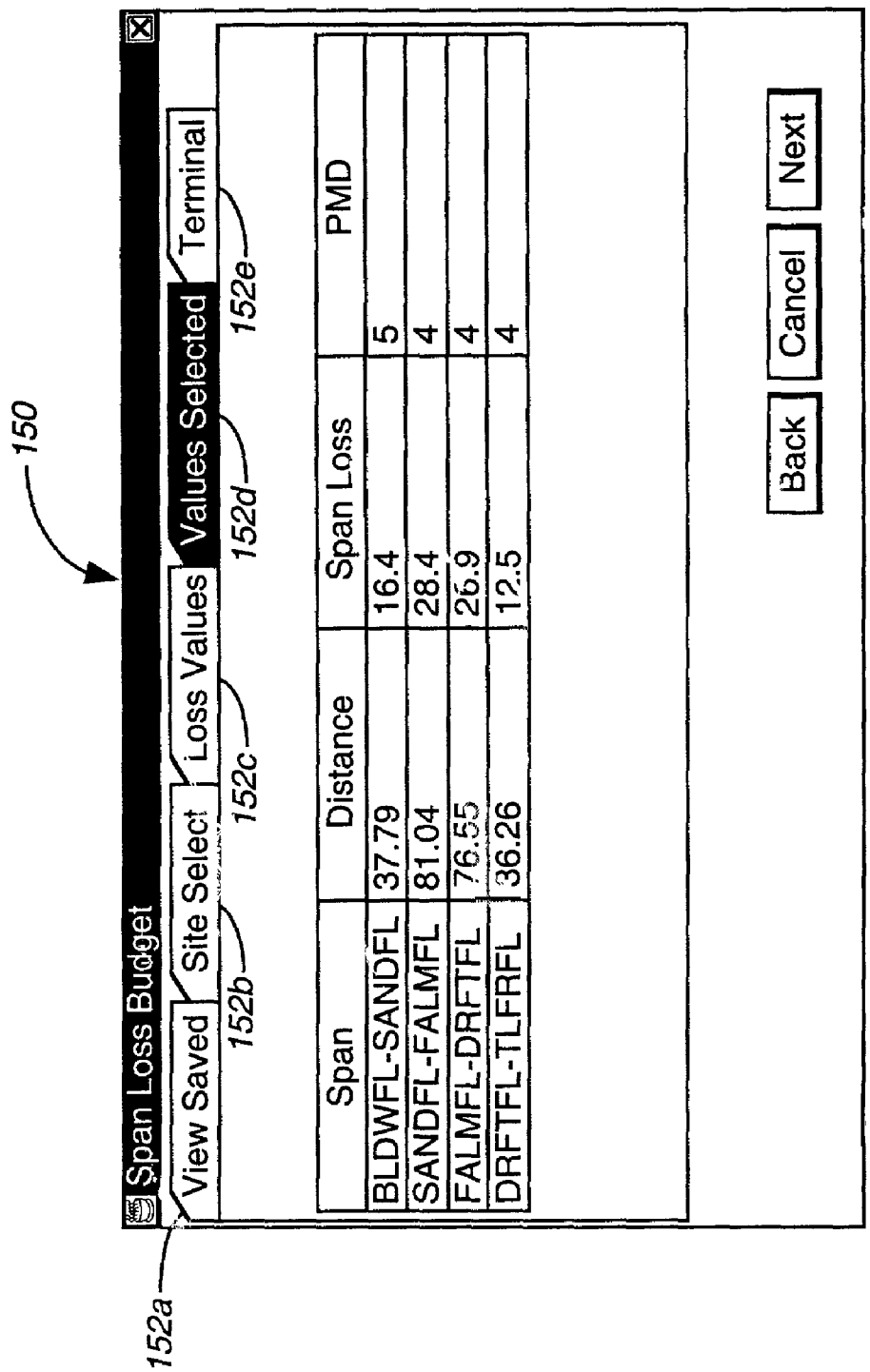

As illustrated in FIG. 9, in one embodiment, the user can invoke the display of a Route-Path-Cable-Fiber tree, for example, by double clicking on a route displayed within workspace window 70, whiteboard window 90, by selecting a pop-up or pull-down menu item, or by dragging a graphical representation of a route into a selected window. Invoking display of the Route-Path-Cable-Fiber tree results in the display of a window 140 displaying a Route-Path-Cable-Fiber tree 142 having the selected route as the highest-level node, one or more paths within each route, one or more cables within each path, and the fiber(s) within each cable.

If the user right clicks on Path icon 144, a pop-up menu is displayed that includes a "Span Loss Budget" item within the menu. In response to selection of the "Span Loss Budget" item, user interface layer 40 of software platform plays a span loss budget window 150, as shown in FIGS. 10A-10E. Span loss budget window 150 is organized with a series of tabs 152a-152e that, when selected, cause the display of window content corresponding to the tab legend. As shown in FIGS. 10A-10E, respectively, the window content corresponding to each tab 152 permits the user to view or edit data required to calculate span loss and PMD values for the cables/fibers connecting any two sites based upon input parameters such as the vendor equipment employed and the distance between sites.

Figure 11:
FIG. 11 illustrates the display of a Cable Connection Span window in accordance with an embodiment of the present invention.

Referring again to FIG. 9, in response to the user right clicking Cable icon 146 within window 140, a pop-up menu is displayed in which a "Cable Properties" item is presented for selection. In response the user selecting the "Cable Properties" item, user interface layer 40 displays a Cable Connection Span window 160, as depicted in FIG. 11. Within Cable Connection Span window 160, the user is permitted to view and edit cable spans in the root node Route. The total span of the Route, which is the sum of the individual cable spans, is also displayed.

With reference again to FIG. 9, in response to the user right clicking Cable icon 146 within window 140, a pop-up menu is displayed in which a "Fiber Properties" item is presented for selection. In response the user selecting the "Fiber Properties" item, user interface layer 40 displays a Span Loss and PMD window 170, as depicted in FIG. 12. Within Span Loss and PMD window 170, the user is permitted to view and edit fiber spans loss and PMD values.

As noted above, the data model maintained in database 20 contains real time data that is subject to continuous update and modification by a number of users. Consequently, the information presented in windows 70, 72, 74, 76, 82, 90, 140, 150, 160, and 170 is also substantially real time and is updated automatically, for example, in response to an explicit "refresh" request by the user, at a selected interval, or each time user input generates an access to database 20.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

For example, although aspects of the present invention have been described with respect to computer systems executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of data processing, comprising:

accessing a data model of a modeled environment from a database, said data model including data defining a plurality of hierarchically arranged subsets of space within the modeled environment and data defining a plurality of items populating the modeled environment;

displaying a whiteboard window within a display device;

in response to at least a first user input selecting a plurality of features of said modeled environment, wherein each of said plurality of features of said modeled environment is one of said plurality of subsets of space or one of said plurality of items, displaying within the whiteboard window a plurality of graphical elements that each represent a respective one of said plurality of user selected features;

presenting to the user a control for at least one function;

in response to a second user input selecting said control for said function, automatically generating a logical connection between at least two of said plurality of features having corresponding graphical elements within the whiteboard window by reference to business rules; and displaying within said whiteboard window a graphical element representing said logical connection.

2. The method of claim 1, further comprising:

displaying, within a display device of a data processing system, one or more second windows including a plurality of user-selectable graphical elements each representing one of said plurality of features; and in response to a third user input, copying said plurality of graphical elements from said one or more second windows into said whiteboard window.

3. The method of claim 2, wherein said copying comprises:

copying at least one of said plurality of graphical elements utilizing a drag-and-drop technique.

4. The method of claim 2, wherein said one or more second windows includes a map window presenting a map of the modeled environment, wherein multiple of said plurality of user-selectable graphical elements are displayed within said map window at diverse locations corresponding to respective locations within said modeled environment of features of said modeled environment corresponding to said multiple graphical elements.

5. The method of claim 1, further comprising:

in response to a third user input selecting one of said plurality of graphical elements within said whiteboard window, presenting data from said database associated with a feature of said modeled environment represented by said graphical element.

6. The method of claim 1, wherein automatically generating a logical connection comprises:

automatically generating a logical connection representing a communication link.

7. The method of claim 1, wherein presenting a control for at least one function comprises:

presenting said control in response to said at least a first user input selecting said plurality of features of said modeled environment.

8. The method of claim 7, wherein said function comprises a first function and said whiteboard window supports a plurality of functions including the first function and a second function, wherein presenting a control comprises:

presenting said control for said first function and refraining from presenting a control for said second function in response to which features of said modeled environment are selected by said at least a first user input.

9. The method of claim 1, further comprising:

maintaining the data model with real time data, and automatically updating said whiteboard window in response to a change in said data model.

10. The method of claim 1, wherein said automatically generating a logical connection comprises:

automatically generating a plurality of alternative logical connections and concurrently displaying within said whiteboard window a plurality of graphical elements representing said plurality of alternative logical connections.

11. The method of claim 10, further comprising:

displaying factors employed in automatically generating said plurality of alternative logical connections.

12. A data processing system, comprising:

a processing unit;

a display device coupled to the processing unit;

an input device coupled to the processing unit;

said processing unit including:

means for accessing a data model of a modeled environment from a database, said data model including data defining a plurality of hierarchically arranged subsets of space within the modeled environment and data defining a plurality of items populating the modeled environment;

means for displaying a whiteboard window within the display device;

means, responsive to at least a first user input selecting a plurality of features of said modeled environment, wherein each of said plurality of features of said modeled environment is one of said plurality of subsets of space or one of said plurality of items, for displaying within the whiteboard window a plurality of graphical elements that each represent a respective one of said plurality of user selected features;

means for presenting to the user, in association with said whiteboard window, a control for at least one function; and means, responsive to a second user input selecting said control for said function, for automatically generating a logical connection between at least two of said plurality of features having corresponding graphical elements within the whiteboard window by reference to business rules and for displaying within said whiteboard window a graphical element representing said logical connection.

13. The data processing system of claim 12, further comprising:

means for displaying, within the display device, one or more second windows including a plurality of user-selectable graphical elements each representing one of said plurality of features; and means, responsive to a third user input, for copying said plurality of graphical elements from said one or more second windows into said whiteboard window.

14. The data processing system of claim 13, wherein said means for copying comprises:

means for copying at least one of said plurality of graphical elements utilizing a drag-and-drop technique.

15. The data processing system of claim 13, wherein said one or more second windows includes a map window presenting a map of the modeled environment, wherein multiple of said plurality of user-selectable graphical elements are displayed within said map window at diverse locations corresponding to respective locations within said modeled environment of features of said modeled environment corresponding to said multiple graphical elements.

16. The data processing system of claim 12, further comprising:

means, responsive to a third user input selecting one of said plurality of graphical elements within said whiteboard window, for presenting data from said database associated with a feature of said modeled environment represented by said graphical element.

17. The data processing system of claim 12, wherein said means for automatically generating a logical connection comprises:

means for automatically generating a logical connection representing a communication link.

18. The data processing system of claim 12, wherein said means for presenting a control for at least one function comprises:

means for presenting said control in response to said at least a first user input selecting said plurality of features of said modeled environment.

19. The data processing system of claim 18, wherein said function comprises a first function and said whiteboard window supports a plurality of functions including the first function and a second function, wherein said means for presenting a control comprises:

means for presenting said control for said first function and refraining from presenting a control for said second function in response to which features of said modeled environment are selected by said at least a first user input.

20. The data processing system of claim 12, wherein the data model comprises real time data, said data processing system further comprising:
means for automatically updating said whiteboard window in response to a change in said data model.

21. The data processing system of claim 12, wherein said means for automatically generating a logical connection comprises:
means for automatically generating a plurality of alternative logical connections and for concurrently displaying within said whiteboard window a plurality of graphical elements representing said plurality of alternative logical connections.

22. The data processing system of claim 21, further comprising:
means for displaying factors employed in automatically generating said plurality of alternative logical connections.

23. A computer-readable medium having instructions stored thereon which when executed by at least one processor cause the at least one processor to perform a method comprising:
accessing a data model of a modeled environment from a database, said data model including data defining a plurality of hierarchically arranged subsets of space within the modeled environment and data defining a plurality of items populating the modeled environment;
displaying a whiteboard window within the display device;
responsive to at least a first user input selecting a plurality of features of said modeled environment, wherein each of said plurality of features of said modeled environment is one of said plurality of subsets of space or one of said plurality of items, displaying within the whiteboard window a plurality of graphical elements that each represent a respective one of said plurality of user selected features;
presenting to the user, in association with said whiteboard window, a control for at least one function;
responsive to a second user input selecting said control for said function, automatically generating a logical connection between at least two of said plurality of features having corresponding graphical elements within the whiteboard window by reference to business rules; and
displaying within said whiteboard window a graphical element representing said logical connection.

24. The computer readable medium of claim 23, further comprising:
displaying, within the display device, one or more second windows including a plurality of user-selectable graphical elements each representing one of said plurality of features; and
responsive to a third user input, copying said plurality of graphical elements from said one or more second windows into said whiteboard window.

25. The computer readable medium of claim 24, wherein said copying comprises:
copying at least one of said plurality of graphical elements utilizing a drag-and-drop technique.

26. The computer readable medium of claim 24, wherein said one or more second windows includes a map window presenting a map of the modeled environment, wherein multiple of said plurality of user selectable graphical elements are displayed within said map window at diverse locations corresponding to respective locations within said modeled environment of features of said modeled environment corresponding to said multiple graphical elements.

27. The computer readable medium of claim 23, further comprising:
responsive to a third user input selecting one of said plurality of graphical elements within said whiteboard window, presenting data from said database associated with a feature of said modeled environment represented by said graphical element.

28. The computer readable medium of claim 23, wherein said automatically generating a logical connection comprises:
automatically generating a logical connection representing a communication link.

29. The computer readable medium of claim 23, wherein said presenting a control for at least one function comprises:
presenting said control in response to said at least a first user input selecting said plurality of features of said modeled environment.

30. The computer readable medium of claim 29, wherein said function comprises a first function and said whiteboard window supports a plurality of functions including the first function and a second function, wherein said presenting a control comprises:
presenting said control for said first function and refraining from presenting a control for said second function in response to which features of said modeled environment are selected by said at least a first user input.

31. The computer readable medium of claim 23, wherein the data model comprises real time data, said method further comprising:
automatically updating said whiteboard window in response to a change in said data model.

32. The computer readable medium of claim 23, wherein said automatically generating a logical connection comprises:
automatically generating a plurality of alternative logical connections and for concurrently displaying within said whiteboard window a plurality of graphical elements representing said plurality of alternative logical connections.

33. The computer readable medium of claim 32, further comprising:
displaying factors employed in automatically generating said plurality of alternative logical connections.

* * * * *